United States Patent
Kitaguchi et al.

(10) Patent No.: US 7,176,890 B2
(45) Date of Patent: Feb. 13, 2007

(54) PROJECTION-TYPE DISPLAY DEVICE AND SOFTWARE PROGRAM

(75) Inventors: Takashi Kitaguchi, Kanagawa (JP); Tomofumi Kitazawa, Kanagawa (JP); Saburo Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 10/085,732

(22) Filed: Mar. 1, 2002

(65) Prior Publication Data

US 2002/0130979 A1 Sep. 19, 2002

(30) Foreign Application Priority Data

Mar. 2, 2001 (JP) ............................. 2001-059321
Aug. 24, 2001 (JP) ............................. 2001-255119
Feb. 26, 2002 (JP) ............................. 2002-050541

(51) Int. Cl.
*G09G 5/00* (2006.01)

(52) U.S. Cl. ..................... 345/158; 345/180; 353/34; 348/744

(58) Field of Classification Search ............... 345/156, 345/157, 163, 700, 9, 8, 158, 180, 182, 183; 178/18.01; 348/774, 744, 750; 349/9; 353/34, 353/35, 74, 77
See application file for complete search history.

(56) References Cited

U.S. PATENT DOCUMENTS

| | | | | |
|---|---|---|---|---|
| 5,504,544 | A * | 4/1996 | Dreyer et al. ................. 353/38 |
| 5,826,962 | A * | 10/1998 | Rodriguez, Jr. .............. 353/82 |
| 5,902,968 | A | 5/1999 | Sato et al. | |
| 5,970,260 | A * | 10/1999 | Nakayama et al. ........... 396/80 |
| 5,981,884 | A | 11/1999 | Sato et al. | |
| 6,084,577 | A | 7/2000 | Sato et al. | |
| 6,084,939 | A * | 7/2000 | Tamura ..................... 378/98.2 |
| 6,118,516 | A * | 9/2000 | Irie et al. ...................... 355/53 |
| 6,141,107 | A * | 10/2000 | Nishi et al. ................. 356/401 |
| 6,229,102 | B1 | 5/2001 | Sato et al. | |
| 6,252,707 | B1 * | 6/2001 | Kleinberger et al. ........ 359/465 |
| 6,332,684 | B1 * | 12/2001 | Shibatani et al. ............. 353/31 |
| 6,388,654 | B1 * | 5/2002 | Platzker et al. ............. 345/156 |
| 6,707,444 | B1 * | 3/2004 | Hendriks et al. ........... 345/156 |

FOREIGN PATENT DOCUMENTS

| | | |
|---|---|---|
| JP | 3-43726 | 2/1991 |
| JP | 04-181857 | 6/1992 |
| JP | 6-347898 | 12/1994 |
| JP | 8-160539 | 6/1996 |
| JP | 10-297166 | 11/1998 |

* cited by examiner

*Primary Examiner*—Richard Hjerpe
*Assistant Examiner*—Abbas I. Abdulselam
(74) *Attorney, Agent, or Firm*—Oblon, Spivak, McClelland, Maier & Neustadt, P.C.

(57) ABSTRACT

A projection surface on which a predetermined projection image is projected is provided; a writing surface on which an image can be drawn directly in a superimposing manner with a projection image displayed on the projection surface is provided; and a photography part photographing an image drawn on the writing surface by means of an image-pickup part comprising two-dimensionally-disposed pixels is provided.

56 Claims, 27 Drawing Sheets

70 PHOTOGRAPHY AREA
51 PHOTOGRAPHY PART

PROJECTION-TYPE DISPLAY DEVICE AND SOFTWARE PROGRAM

BACKGROUND OF THE INVENTION

1. Field of the Invention

The present invention relates to a projection-type display device, and, in particular, to a projection-type display device having a novel feature of improving a system of combining an image projected and an image drawn thereon by a user.

2. Description of the Related Art

Conventionally, generally, a projection-type display device is applied to a projector, a media board with a display device, a personal computer, etc., is used as a monitor for two or more persons in a meeting, a lecture, etc., or is used as a monitor, such as in a personal computer used individually.

Such a projection-type display device is demanded to have a feature such that letters/characters, and/or pictures may be drawn on a display device in a superimposing manner together with an image projected there, and, also, the thus-drawn letters/characters and/or pictures can be obtained as electronic data.

For this purpose, an art is proposed in which a position of a nib contacted on a display screen is detected, and is traced. However, in order to detect the position at which the nib contacts, it is necessary to provide a special pen with the nib. Furthermore, in order to add/erase a letter/character/picture, it is needed to appropriately change a screen operation mode. Thus, the whole system becomes expensive and operation becomes complex.

Further, another art is disclosed by Japanese laid-open patent application No. 3-43726 in which an image drawn by a nib or the like on a display screen is scanned by a line-type photo-sensor, and, the thus-detected image is printed out. However, as the line-type photo-sensor should have a size corresponding to the size of the screen, the scanner should be larger in the case the size of the screen is larger. In such a case, as the scanner mechanically scans the screen, a mechanism of moving the scanner also may be large-sized. Thus, the whole system may become bulky. Also, as the screen is scanned by the scanner mechanically, a considerable time is required to read the whole image present on the screen.

According to a media board disclosed in Japanese laid-open patent application No. 6-347898, while an image printed on a transparent sheet is displayed on a screen, it is possible to draw/write letters/characters/pictures thereon. Further, as a scanner scans the thus-drawn image, the scanned image can be easily printed out, as a hard copy. However, in this art, as the scanner mechanically scans the image present on the screen, the problems same as in the above-mentioned art may occur, i.e., the whole system may become bulky.

According to a so-called optical blackboard disclosed by Japanese laid-open patent application No. 8-160539, as a user points on a screen by a special pen, an image is projected thereon according to a locus along which the user has moved the pen on the screen through a function of a photo-sensing technology or a pressure-sensing technology. In this art, as an image is displayed on the screen as a result of the user moving the special pen on the screen and then the movement being detected by the system, the relatively complex system is needed merely for drawing an image on the screen by the user, in comparison to a case where a user draws an image directly on a screen with ink or the like by using a common ink-used pen as in a common whiteboard.

According to a media board disclosed by Japanese laid-open patent application No. 10-297166, an image drawn on a screen is read electronically, the read image data is combined with another image being projected on the screen. However, no specific configuration of how to read a drawn image is disclosed in the publication.

SUMMARY OF THE INVENTION

The present invention is directed to the above-mentioned problems, and, an object of the present invention is to provide a projection-type display device in which, as a writing surface on which a user draws/writes an image is made approximately coincident with an image projection surface, operativity is improved, the whole system is simplified, and, also, the cost needed can be effectively reduced.

Further, according to the present invention, a software program for controlling the above-mentioned projection-type display device from an external personal computer etc., is provided. Thereby, it is possible to provide the projection-type display device less costly.

According to the present invention, a projection surface is provided on which a predetermined projection image is displayed through projection; a writing surface is provided on which an image can be drawn directly in a superimposing manner with the projection image displayed on the projection surface; and a photography part is provided for photographing the image drawn on the writing surface by means of an image-pickup part comprising two-dimensionally-disposed pixels.

Thereby, as a user can draw any image such as letters/characters/pictures on the writing surface in a manner same as in a case of a common whiteboard or blackboard, and, thus, a user-friendly system can be provided. Further, as it is possible to draw an image on the writing surface superimposing manner with the projection image displayed on the projection surface, the drawn image and projection image are combined properly on the sight of the user. Accordingly, a high-operative system can be provided.

Further, as the drawn image is photographed through an image-pickup part having two-dimensionally disposed pixels (such as a so-called digital still camera), it is easy to read the drawn image rapidly, and, also, it is not necessary to prepare a large-sized configuration to read even a large-sized image drawn on a screen. Accordingly, the whole system can be effectively miniaturized, and, thus, it becomes less costly.

BRIEF DESCRIPTION OF THE DRAWINGS

Other objects and further features of the present invention will become more apparent from the following detailed description when read in conjunction with the following accompanying drawings.

DETAILED DESCRIPTION OF THE PREFERRED EMBODIMENTS

Figure 1:
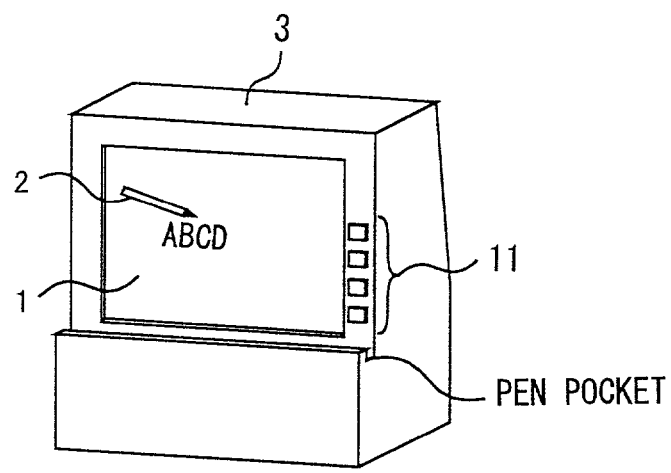
FIG. 1 shows an outline view of a projection-type display device in each embodiment of the present invention.

Preferred embodiments of the present invention will now be described. However, respective components, specific types thereof, combinations, shapes, relative spatial arrangements, and so forth thereof which will be described are merely examples, and the present invention is not limited thereto. Further, for the same components, the same reference numerals will be given throughout the respective embodiments.

FIG. 1 shows an appearance of a projection-type display device in a first embodiment of the present invention.

In this projection-type display device, a user can write, by using a pen 2 for writing, letters/characters, images, etc. on a writing field 1. As for the pen 2 for writing, a generally sold marker used for writing onto a whiteboard, such as a common pen employing alcoholic ink, may be used. Further, the writing field (sheet) 1 is made of material such that an image projected on a transparent screen 6 (see FIG. 2) provided on the side opposite to the user side can be sufficiently transmitted thereby. Thereby, the user can view an image projected on the transparent screen 6 by a projector 4 (see FIG. 2) through the writing field 1. In addition, such a treatment is made on a surface of the writing field 1 on which writing is made by the user that an image drawn thereon by ink may be easily erased by a cloth or the like, as in a common whiteboard.

Figure 3:
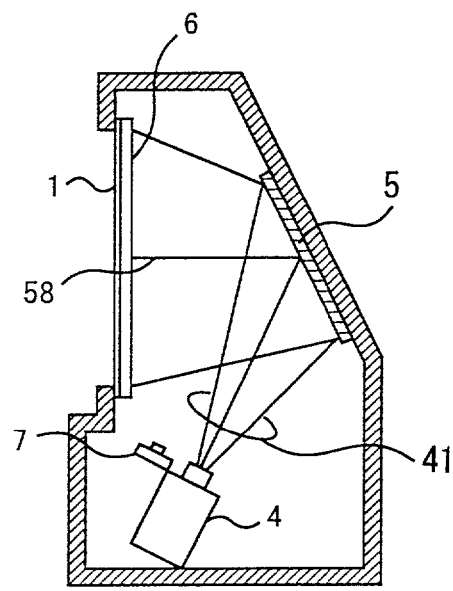

The projection-type display device is enclosed by a housing 3 such that, as shown in FIG. 3, particularly a zone through which a light beam 41 passes from the projector 4 to the screen 6 is enclosed thereby. Further, switches 11 which provide functions as a user interface are provided on the housing 3, and, thereby, the user can freely control various conditions in the projector 4 and a CCD (Charge Coupled Device) camera 7, such as image display conditions, image-pickup conditions, and so forth.

Figure 2:
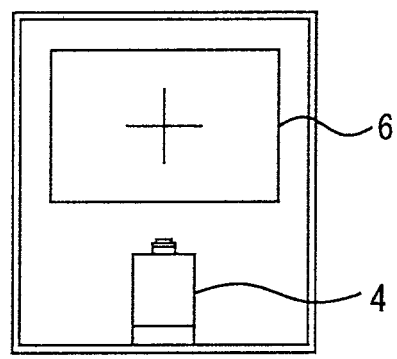
FIGS. 2 and 3 show an internal configuration of the projection-type display device shown in FIG. 1.

FIG. 2 shows an inside rear view of the projection-type display device in the first embodiment while FIG. 3 shows an inside side view of the same.

The projector 4 projects an image onto the transparent screen 6 through a reflective mirror 5. The transparent screen 6 is provided inside with respect to the writing field 1. In this configuration, since the field 1 is transparent, the user can view the projected image through the writing field 1 from the outside.

Further, an image written/drawn onto the writing field 1 by the user can also be viewed from the inside of this projection-type display device through the transparent writing field 1 and the transparent screen 6. Therefore, the CCD camera 7 provided inside of the display device can take a picture of the image written/drawn on the writing field 1. In the first embodiment, the CCD camera 7 takes a picture of an image written on the writing field 1 also through the reflective mirror 5.

Furthermore, by a processing control part 8 (see FIG. 4) provided inside of the display device, predetermined processing is performed, and an image electronically taken in by the CCD camera 7 is output to the outside through an input-and-output part 9 (see FIG. 4) also provided in the display device.

In addition, the projector 4, reflective mirror 5, and transparent screen 6 mainly act as a projection part, while the CCD camera 7, writing field 1 and reflective mirror 5 mainly act as a photography part. Further, the switches 11 mainly act as a mode selection part.

According to a basic feature of the projection-type display device described above, this display device is superior in terms of user interface. With the same feeling as in a common blackboard or whiteboard, the user can draw letters/characters, line drawings, etc. onto the writing field 1. Further, the user can change photography (picture taking) processing modes, described later, easily.

Further, according to the first embodiment, preferably, an image projected onto the transparent screen 6 and an image taken in from the writing field 1 can be used independently. For this purpose, preferably, the projection-type display device is configured such that the image projected and the image taken in are taken independently. Furthermore, preferably, the surface on which an image is projected (transparent screen 6) and a surface on which an image is drawn (writing field 1) are made approximately coincident. Thereby, a taken-in drawn image can be easily superimposed on a projected image through the sight of the user. Thereby, the projection-type display device excellent in operativity and functionality can be provided.

Figure 4:
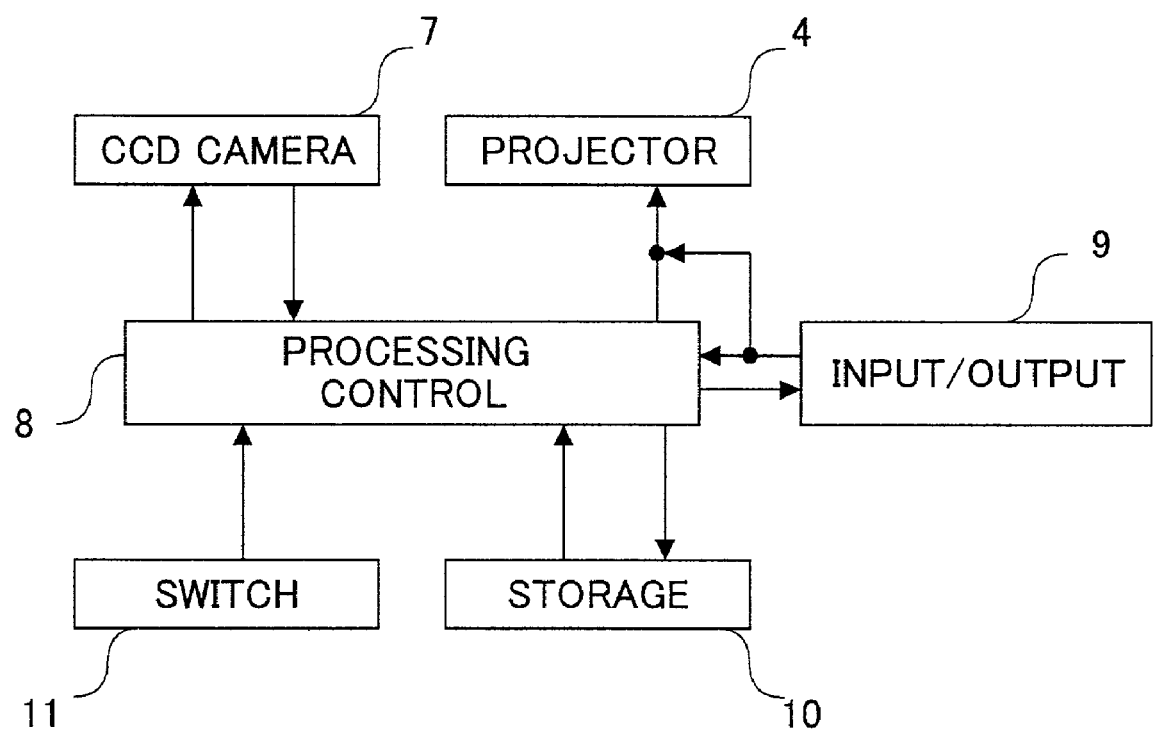
FIG. 4 shows a block diagram of a projection-type display device in a first embodiment of the present invention.

With reference to FIG. 4, a block configuration of the projection-type display device in the first embodiment will now be described in detail.

Figure 5:
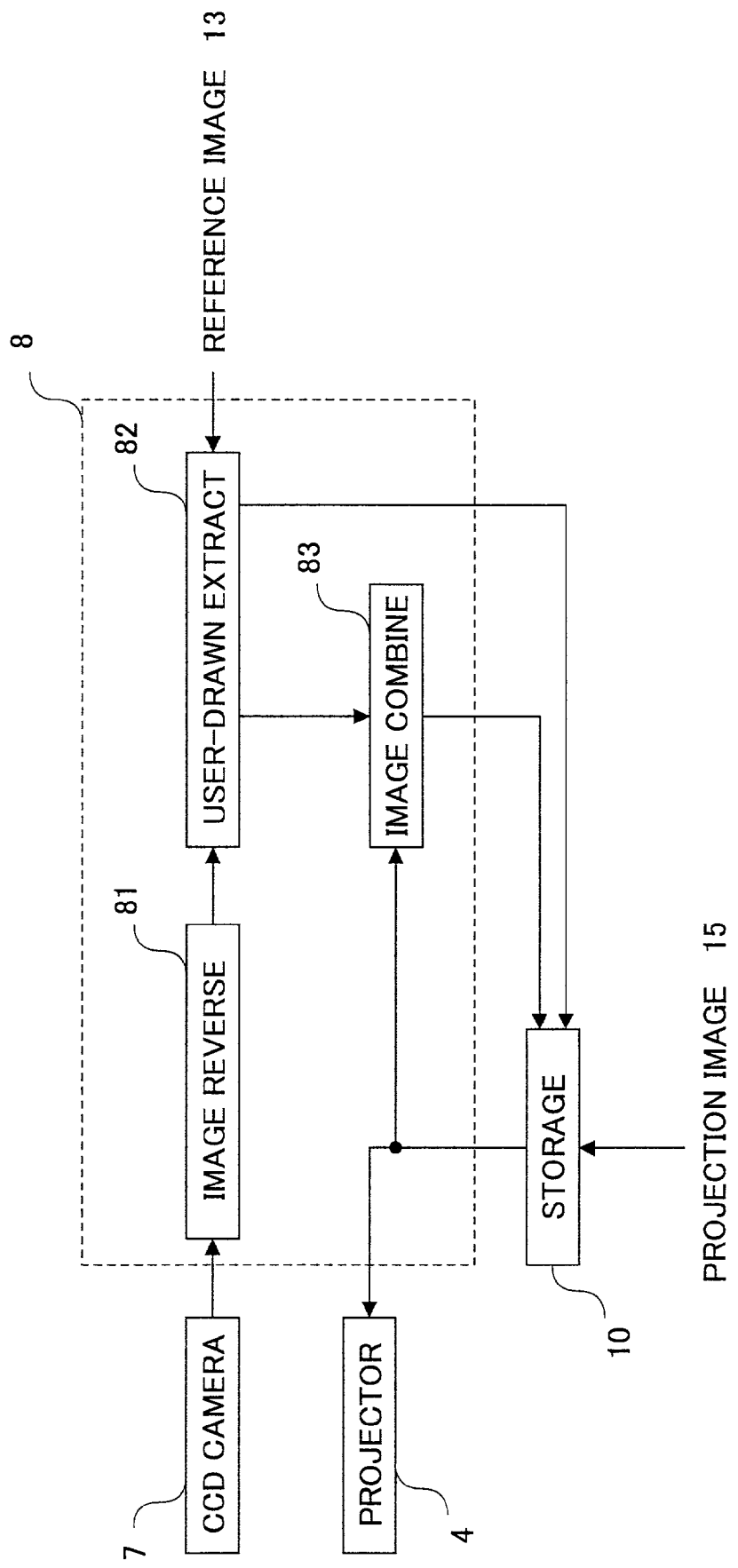
FIG. 5 shows a block diagram of a processing control part shown in FIG. 4.

In FIG. 4, the processing control part 8 performs control of the CCD camera 7 and projector 4 based on signals from the switches 11. Furthermore, the processing control part 8 executes a software program read from a storage part 10 with using a work area in the storage part 10 appropriately, and also executes a function of extracting an image drawn by the user from an image taken in through the CCD camera 7 as shown in FIG. 5.

Further, the processing control part 8 produces an image (combined image) in combination of an image displayed onto the projector 4 and an image (user-drawn image) drawn by the user and taken in by the CCD camera 7. Furthermore, the processing control part 8 also controls processing of storing the user-drawn image and the above-mentioned combined image in the storage part 10, and processing of outputting them to the outside through the input-and-output part 9.

The input-and-output part 9 performs processing of inputting, into the internal processing control part 8 and into the internal projector 4, image signals outputted from an external personal computer etc., and processing of outputting the user-drawn image and combined image output from the processing control part 8 to the outside. In addition, this input-and-output part 9 includes I/O interfaces, such as a USB (Universal Serial Bus) interface, an IEEE1394 interface, and a SCSI (Small Computer System Interface), and/or includes an interface with a video card in an external apparatus, such as a PC.

The switches 11 are used for controlling ON/OFF of the projector 4, input of user's instructions for taking a picture of user-drawn image by the CCD camera 7, and selection between two types of photography processing modes.

These two types of photography processing modes will now be described. The first photography processing mode is a mode of operation for extracting and acquiring only the above-mentioned user-drawn image, and a second photography processing mode is a mode of operation for acquiring the above-mentioned combined image in which the user-drawn image and projection image are combined. These two photography processing modes are executed as a result of the processing control part 8 reading a predetermined software program from the storage part 10, as shown in FIG. 5.

As shown in FIG. 5, the processing control part 8 includes an image reversal part 81 which reverses right and left of an image of an image signal input from the CCD camera 7, a user-drawn extraction part 82 which extracts a user-drawn image from the thus-reversed image, and an image combining 83 which combines the user-drawn image with a projection image. Further, in this configuration, the image signal provided by the user-drawn extraction part 82 or the image combining part 83 is stored by the storage part 10, is input into the projector 4 through the processing control part 8, or is output to an external apparatus through the input-and-output part 9.

Figure 6:
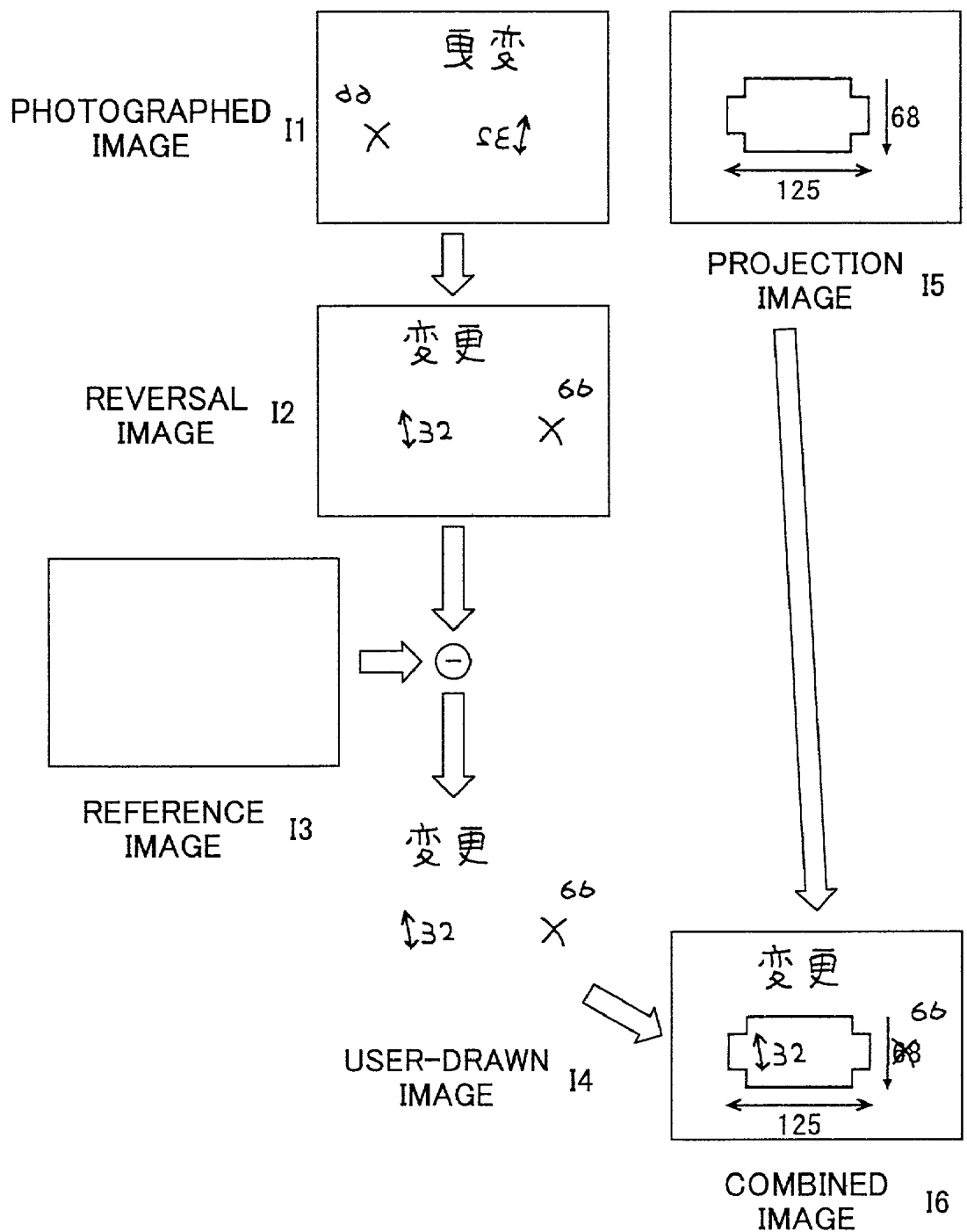
FIG. 6 illustrates operations of producing a user-drawn image and a combined image according to the present invention.

With reference to FIG. 6, the operation according to the first photography processing mode will now be described. When the first photography processing mode is selected through the switches 11 by a user, the processing control part 8 causes the CCD camera 7 to take a picture of the writing field 1. Thereby, a photographed image I1 in which right and left are reversed as shown in FIG. 6 is acquired as a result of the picture was taken through the reflective mirror 5 shown in FIG. 3. Then, the processing control part 8 provides a reversal image I2 by reversing the right and left of the photographed image I1 through the image reversal part 81.

Furthermore, the processing control part 8 causes the image extraction part 82 to extract a user-drawn image I4 from the reversal image I2. This extraction is achieved as a result of the reversal image I2 having a reference image I3 previously taken at a state in which nothing is drawn in the writing field 1 and then reversed between right and left thereof subtracted therefrom. Thereby, any images, other than the user-drawn image currently drawn by user, such as cracks or the like of the transparent screen 6, are removed. Then, the user-drawn image I4 is stored by the storage part 10, for example, or is output to the external apparatus through the input-and-output part 9.

Similarly operation in the second photography processing mode will now be described with reference to FIG. 6. When the second photography processing mode is selected through the switches 11 by the user, the processing control part 8 extracts the user-drawn image I4 from the photographed image I1 obtained through the CCD camera 7, as in the case of the first photography mode. After the user-drawn image I4 is stored by the storage part 10 temporarily, it is input into the image combining part 83. Then, a projection image I5 currently stored in the storage part 10 is also input into the image combining part 83. Then, the image combining part 83 combines the user-drawn image I4 and the projection image I5 together, and outputs the combined image I6.

As for the user-drawn image I4 and the projection image I5, correspondence therebetween is made by the processing control part 8. That is, the projection image projected when the user-drawn image is taken by the CCD camera 7 in response to the operation made onto the switches 11 is made to have a correspondence to this user-drawn image. For this purpose, the processing control part 8 stores the projection image I5 together with the user-drawn image I4 in a manner of making correspondence therebetween into the storage part 10. Thereby, it is possible to take these images together easily in future. Further, the combined image I6 is stored by the storage part 10, for example, or is output to the external apparatus through the input-and-output part 9.

Figure 7A:
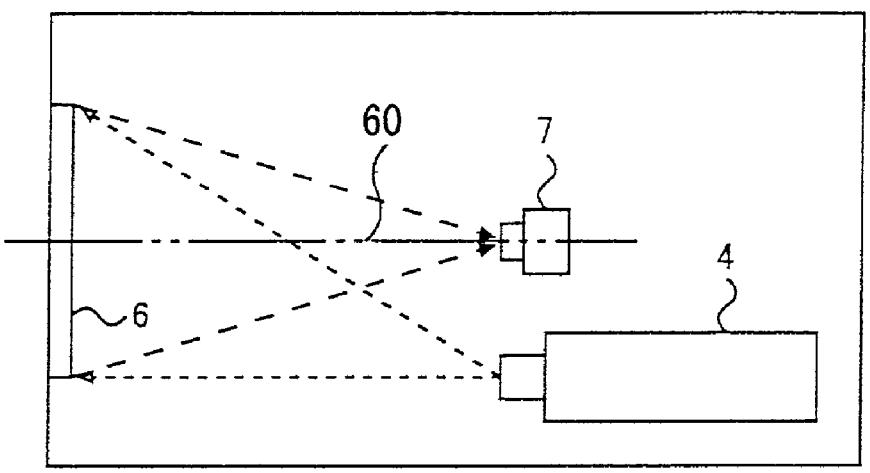
FIGS. 7A and 7B illustrate two types of internal arrangement of the projection-type display device in the first embodiment of the present invention.

Further, since the projector 4 and CCD camera 7 use the approximately same surface (the writing field 1 and transparent screen 6), as shown in FIG. 7A, it is easy to combine the user-drawn image I4 obtained from the photographed image I1 with the projection image I5 by making the optical axis of the CCD camera 7 coincident with a centel axis 60 of the writing field 1, the center axis 60 being perpendicular to the writing field 1.

However, in the example shown in FIG. 7A, for the sake of simplification of illustration, the reflective mirror 5 is omitted. In case the CCD camera 7 is disposed on the center axis 60 of the writing field 6 as shown in the figure, it is necessary to make the optical axis of the projector 4 to be inclined as shown in FIG. 7A. Such inclination of the optical axis can be achieved by using a well-known function of a common projector.

Figure 7B:
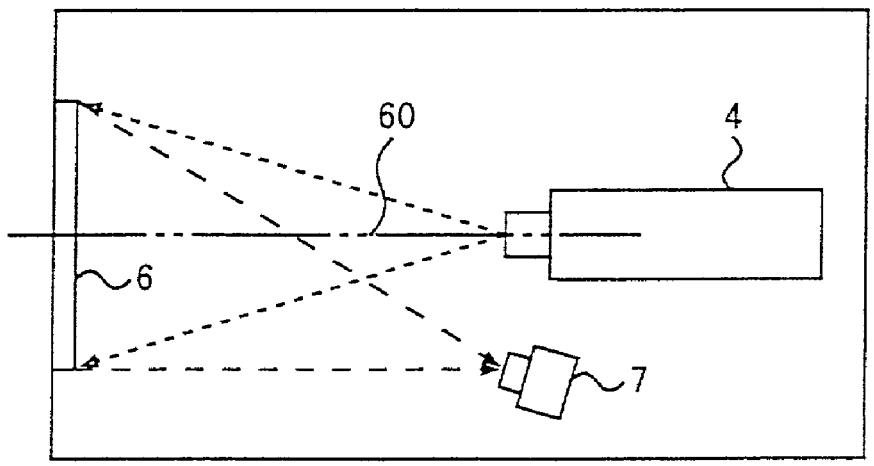

Further, in case where the projector 4 is disposed on the center axis 60 of the writing field 1 as shown in FIG. 7B, although it is not necessary to incline the optical axis of the projector 4 as mentioned above, it is necessary to perform tilt correction on a photographed image acquired by the CCD camera 7. Such a tilt correction can be performed according to a well-known common way, and, in this embodiment, the processing control part 8 performs tilt correction on the photographed image I1.

Furthermore, in the embodiment, projection of an image by the projector 4 may be interrupted when the user-drawn image is picked up by the CCD camera 7. Thereby, it can be prevented that the projection image becomes obstructive to the photography of the user-drawn image, and, thereby, the user-drawn image cannot be extracted properly. Further, in addition to this, the photographed image which also contains the projection image may be acquired by the CCD camera 7, and, then, the projection image may be subtracted from the photographed image (reversal image).

The storage part 10 mainly includes a recording part, and the input-and-output part 9 mainly includes an input part and an output part. The image projected by the projector 4 and the image photographed by the CCD camera 7 may be appropriately processed by an external personal computer, or the like. For this purpose, the storage part 10 which once stores the image and the input-and-output part 9 which transmits the data to the external personal computer are needed.

Further, the image projected by the projector 4 may be of image data processed by the external apparatus, or the photographed projection image itself. Therefore, the input-and-output part 9 is also needed. Thereby, a selected image can be recorded in the above-mentioned storage part 10 or it can be transmitted to the external apparatus through the above-mentioned input-and-output part 9, and, thus, it becomes easier to perform image data processing by using the external processing apparatus.

Figure 8:
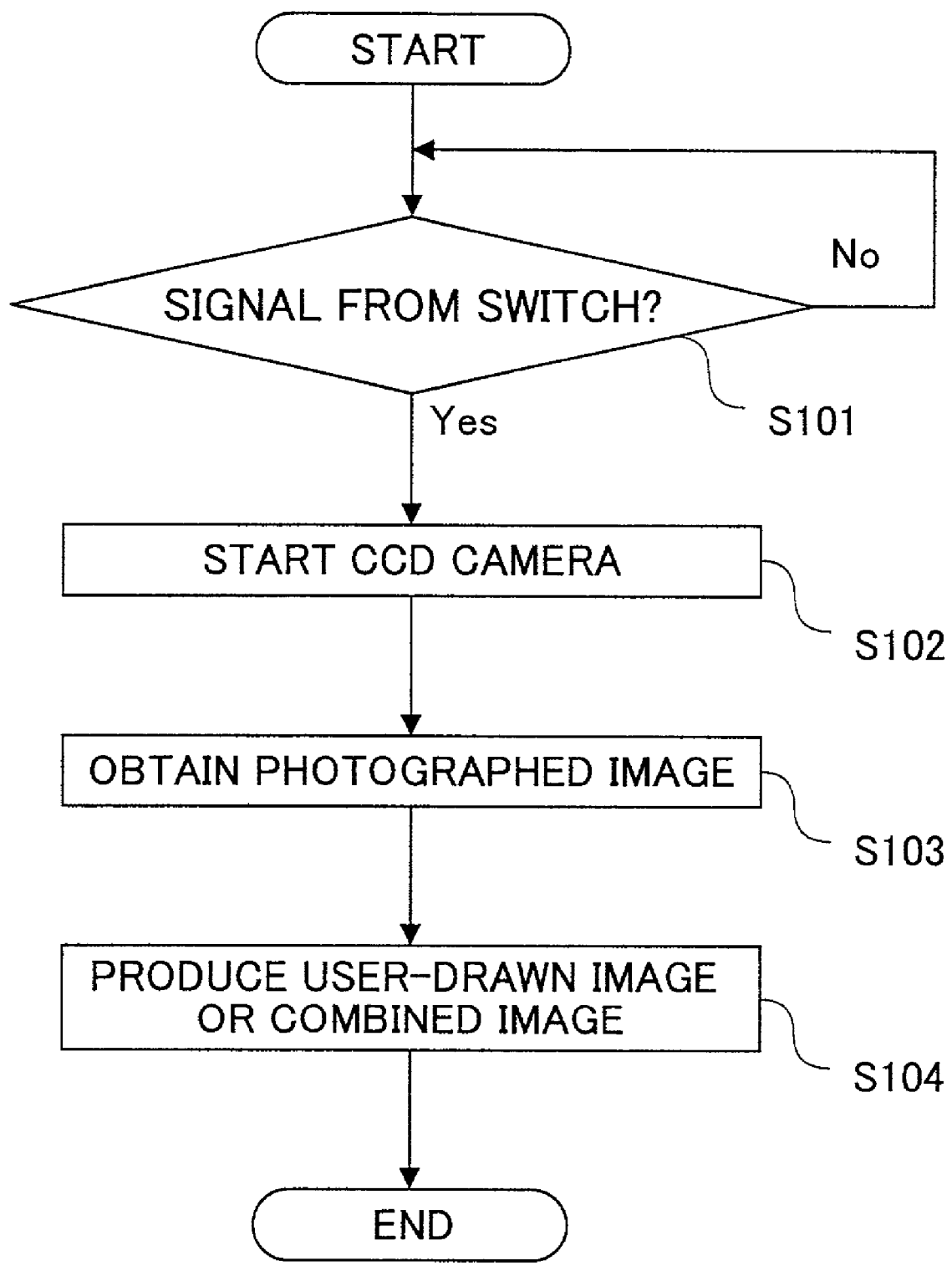
FIG. 8 shows a flow chart illustrating operation of the projection-type display device in the first embodiment of the present invention.

Operation of the processing control part 8 in the first embodiment will now be described with reference to FIG. 8. In response to a signal coming from the switches 11 indicating photography (Yes of a step S101), the processing control part 8 sends instructions such that an image on the writing field 1 be taken by the CCD camera 7 (in a step S102), and then, the processing control part 8 receives a photographed image therefrom (in a step S103). At this time, the light source in the projector 4 may be turned off, as mentioned above.

Then, the processing control part 8 produces the user-drawn image I4 or combined image I6 according to the process shown in FIG. 6 (in a step S104). The user-drawn image or combined image thus produced is stored by the storage part 10, or is output to the external apparatus through the input-and-output part 9.

Thereby, the projection-type display device can easily acquire information input through handwriting/drawing by the user as image information.

In the above-described first embodiment, processing such as control of the projector 4, CCD camera 7, switches 11, reversal of a photographed image obtained by the CCD camera 7, image extraction, image combining, etc. is performed by the processing control part 8 provided inside of the projection-type display device. According to a second embodiment of the present invention, as will now be described, this processing is performed by an external apparatus, such as a personal computer, instead.

Figure 9:
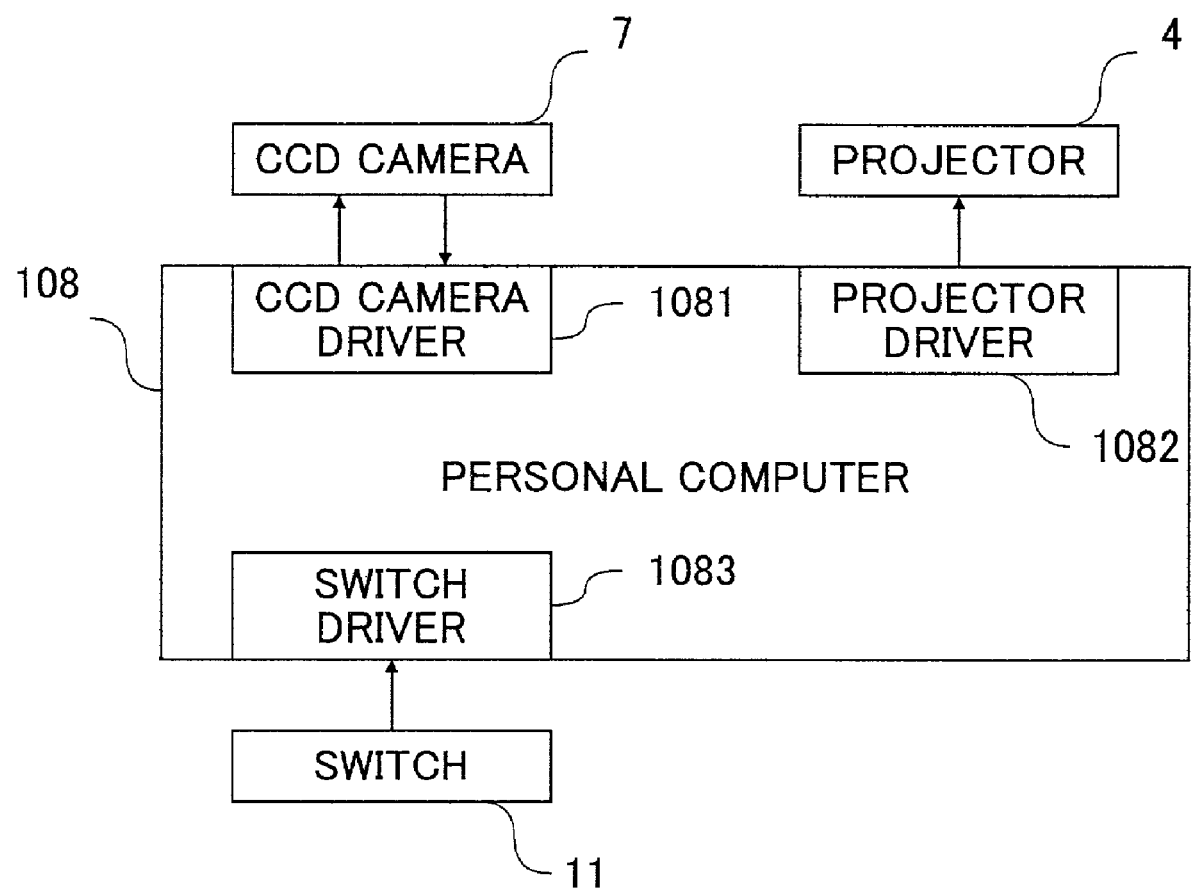
FIG. 9 shows a block diagram of a projection-type display device and a personal computer according to a second embodiment of the present invention.

According to the second embodiment, as shown in FIG. 9, the projector 4, CCD camera 7 and switches 11 are connected to a personal computer 108 provided inside or outside of a projection-type display device as shown in FIG. 9. USB, IEEE1394, SCSI, etc. are applied as the interface for connecting these respective components. Driver software (a CCD camera driver 1081, a projector driver 1082, and a switch driver 1083) for controlling the CCD camera 7, projector 4, and switches 11 is installed in the personal computer 108, and, thereby, control of each component, and input and output of various instructions and/or data therefrom/thereto are performed.

Thus, according to the second embodiment, the configuration of the projection-type display device is simplified, and, also, a predetermined software provides various control processing needed. Thereby, the projection-type display device can be provided at low cost.

Since the other configurations and operations are the same as those of the first embodiment, duplicated description is omitted.

According to the second embodiment, the function of the processing control part 8 in the first embodiment is achieved directly by the CPU (central processing unit) included in the personal computer 108.

Figure 10A:
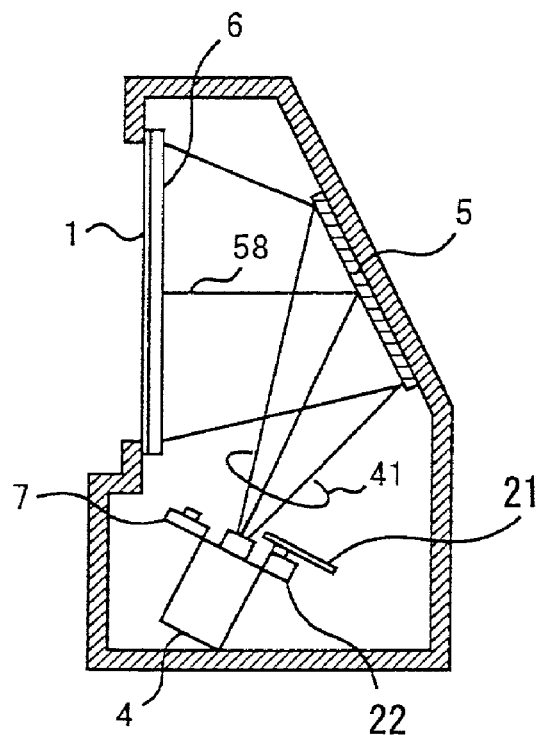
FIGS. 10A and 10B illustrate a projection-type display device in a third embodiment of the present invention.
Figure 10B:
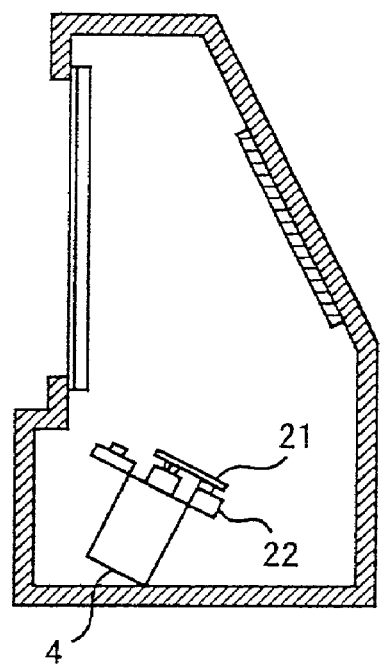

A projection-type display device in a third embodiment of the present invention will now be described. FIGS. 10A and 10B illustrate an inner structure of the projection-type display device in the third embodiment.

According to the above-mentioned first embodiment, when the light source in the projector 4 is turned off in order to prevent floodlighting of the projector 4 from being applied in photographing a user-drawn image formed on the writing field 1 by the CCD camera 7, a considerable time is taken for again starting up the floodlighting for image projection by the projector 4, and, also, the life of the power supply thereof may be shortened through repetitive turning on/off thereof. In order to avoid such a situation, as shown in FIGS. 10A and 10B, a light-blocking plate 21 for blocking the light beam emitted from the projector 4 is provided in the third embodiment of the present invention.

In the configuration of the third embodiment, the light-blocking plate 21 is removed and thus, the transparent screen 6 can have an image projected thereunto from the projector 4 at a time of image projection, as shown in FIG. 10A. On the other hand, at a time of photography of a user-drawn image formed on the writing field 1, the light-blocking plate 21 is placed in front of the projector 4, and thereby, the light beam emitted by the projector 7 is prevented from reaching the transparent screen 6, as shown in FIG. 10B. Removing and inserting of the light-blocking plate 21 mentioned above is performed by using a stepper motor 22, or the like which is driven and controlled by the processing control part 8.

Figure 11:
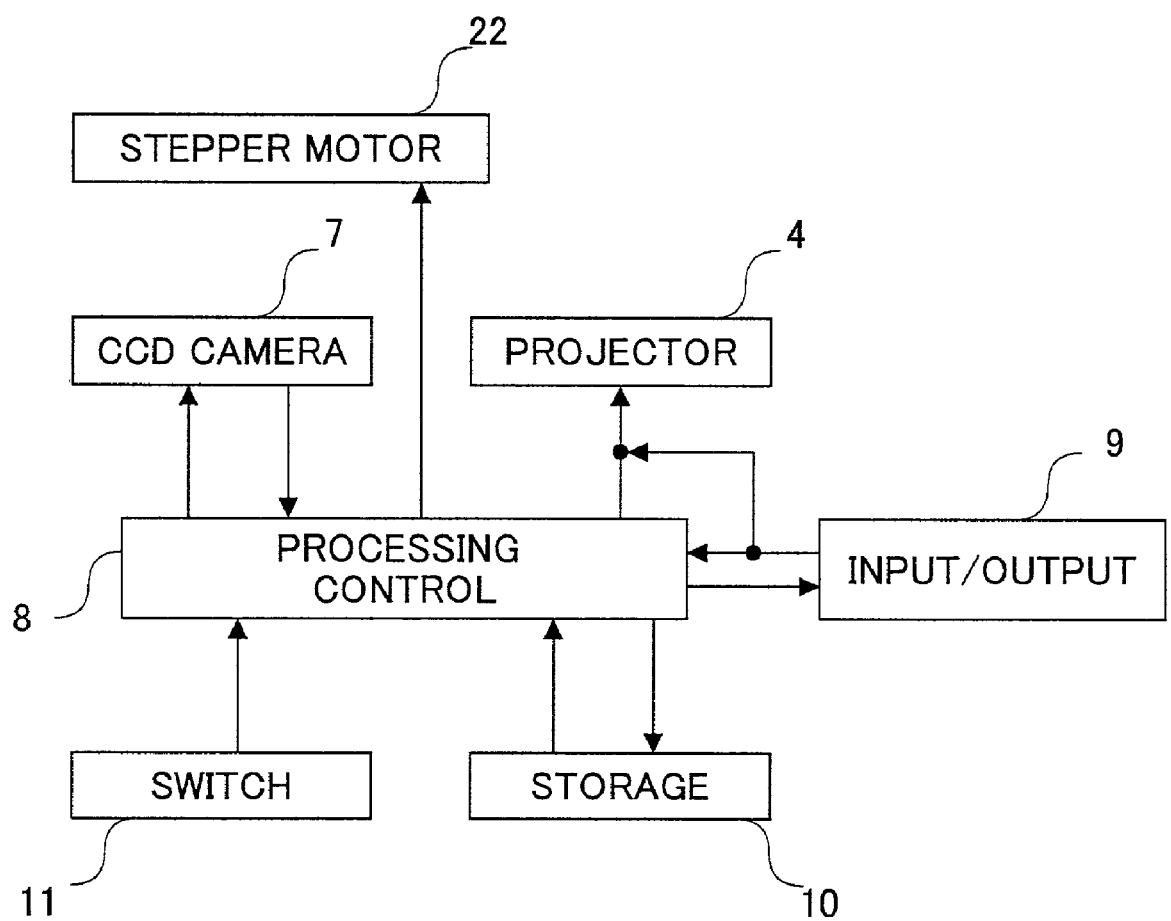
FIG. 11 shows a block diagram of the projection-type display device in the third embodiment of the present invention.

FIG. 11 is a block diagram showing a configuration of the projection-type display device in the third embodiment. Thus, different from the above-mentioned first embodiment, the projection-type display device according to the third embodiment includes the stepper motor 22, and the processing control part 8 controls the stepper motor 22, and thus controls removing and inserting of the light-blocking plate 21 appropriately from/to the front side of the projector 4.

As described above, the first or second photography processing mode is the mode in which an image which a user draws onto the writing field 1 is photographed by the CCD camera 7. However, if a projection image formed by the projector 4 is present on the transparent screen 6, the user-drawn image formed on the writing field 1 may not be photographed clearly. This is because a halogen lamp is generally used as the light source of the projector 4, and, thus, it may be difficult to clearly photograph the user-drawn image superimposed on the projection image in terms of brightness and luminous energy.

Then, it is desirable at a time of the first or second photography processing mode to prevent the image from being projected by the projector 4. Since the light beam emitted by the projector 4 is thus blocked by the light-blocking plate 21 at a time of the first or second photography mode according to the third embodiment, the user-drawn image on the writing field 1 can be photographed independently and clearly.

Figure 12:
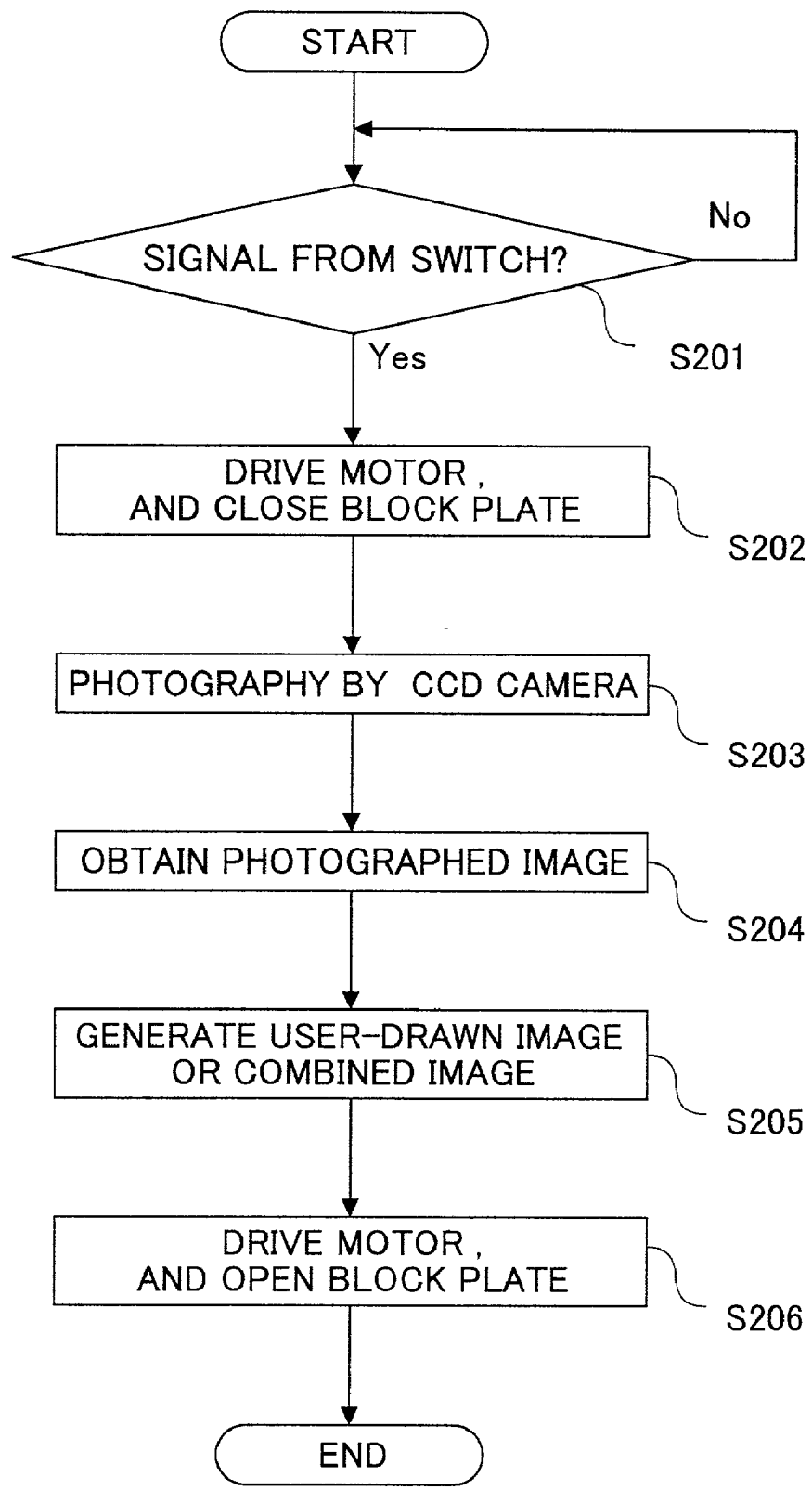
FIG. 12 shows a flow chart illustrating operation of the projection-type display device in the third embodiment of the present invention.

Operation of the processing control part 8 according to the third embodiment will now be described with reference to FIG. 12. The processing control part 8 drives the stepper motor 22 so as to make the light-blocking plate 21 be inserted, and, thus, block the light beam emitted by the projector 4 (Step S202), when a signal is inputted from the switches 11 (Yes of a step S201). Then, after the light beam from the projector 4 is blocked, the processing control part 8 controls the CCD camera 7 so as to cause it to photograph the image on the writing field 1 (in a step S203), and acquires the thus-photographed image (in a step S204). At this time, the light source of the projector 4 is not turned off.

Then, the processing control part 8 produces the user-drawn image or combined image according to processing shown in FIG. 6 from the photographed image acquired in the step S204 (in a step S205). Then, the user-drawn image or combined image thus generated is stored as mentioned above in the storage part 10, or is output to the external apparatus from the input-and-output part 9.

Then, after acquiring the photographed image in the step S204, the processing control part 8 drives the stepper motor 22 so that the light-blocking plate 21 may be removed and allows the projection image to be displayed on the transparent screen 6 (in a step S206).

Thus, according to the third embodiment, since the photographed image can be obtained in a condition in which the light beam from the projector 4 is prevented from reaching the transparent screen 6 without turning off of the light source of the projector 4, the life of the projector 4 can be prevented from being superfluously shortened.

Since the other configurations and operations are the same as those of the first embodiment, duplicated description is omitted.

Figure 13:
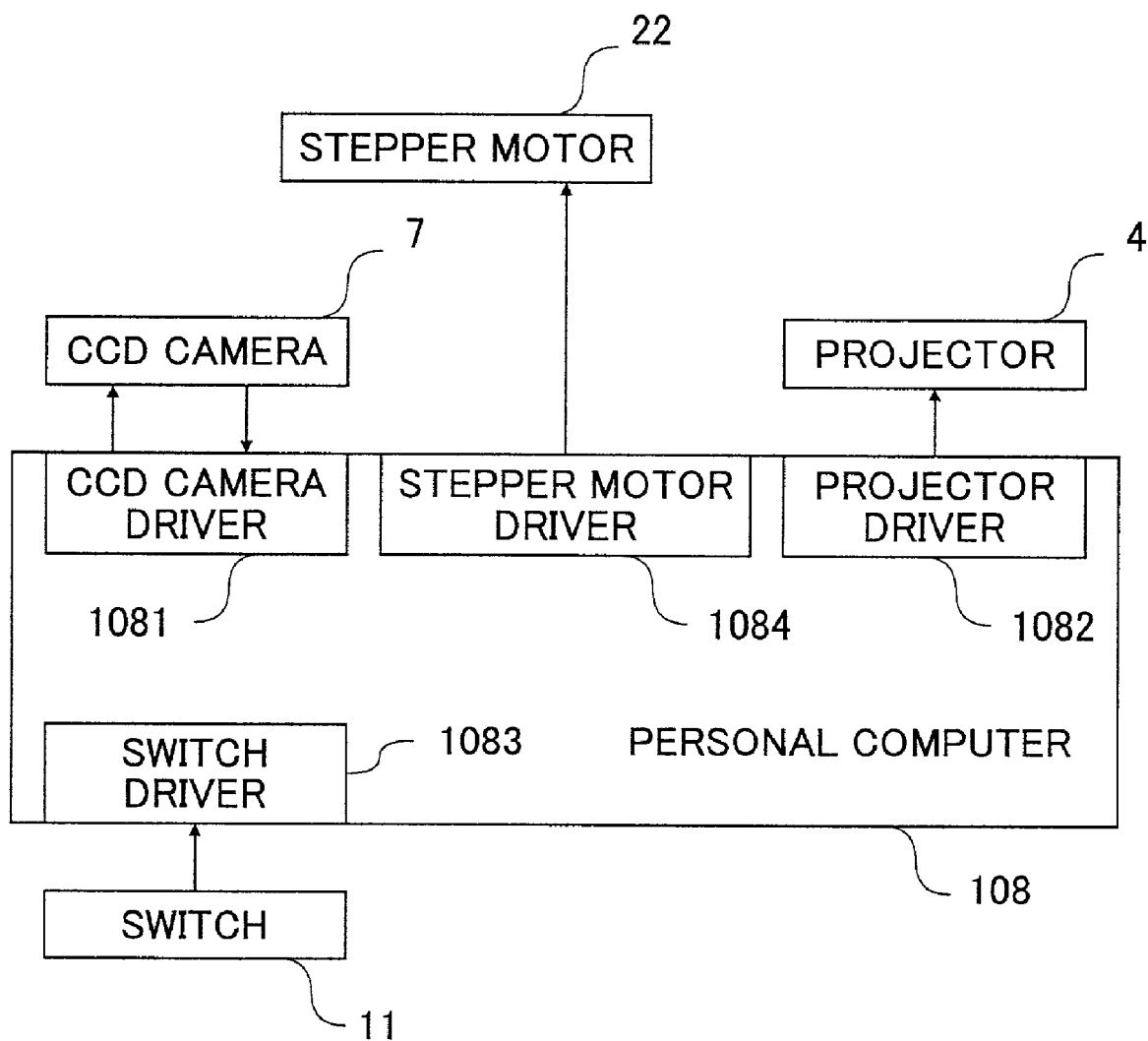
FIG. 13 shows a block diagram of a projection-type display device and a personal computer according to a fourth embodiment of the present invention.

The above-mentioned third embodiment may also be configured by utilizing a personal computer or the like together with software programs as the above-mentioned first embodiment is modified into the second embodiment, as in a fourth embodiment of the present invention. FIG. 13 shows a block diagram of this fourth embodiment of the present invention. This block configuration is the same as that of the second embodiment shown in FIG. 9 except that the stepper motor 22 and a stepper motor driver 1084 (application software) are added. All the functions/operations of the fourth embodiment are the same as those of the third embodiment, and duplicated description is omitted.

Figure 14:
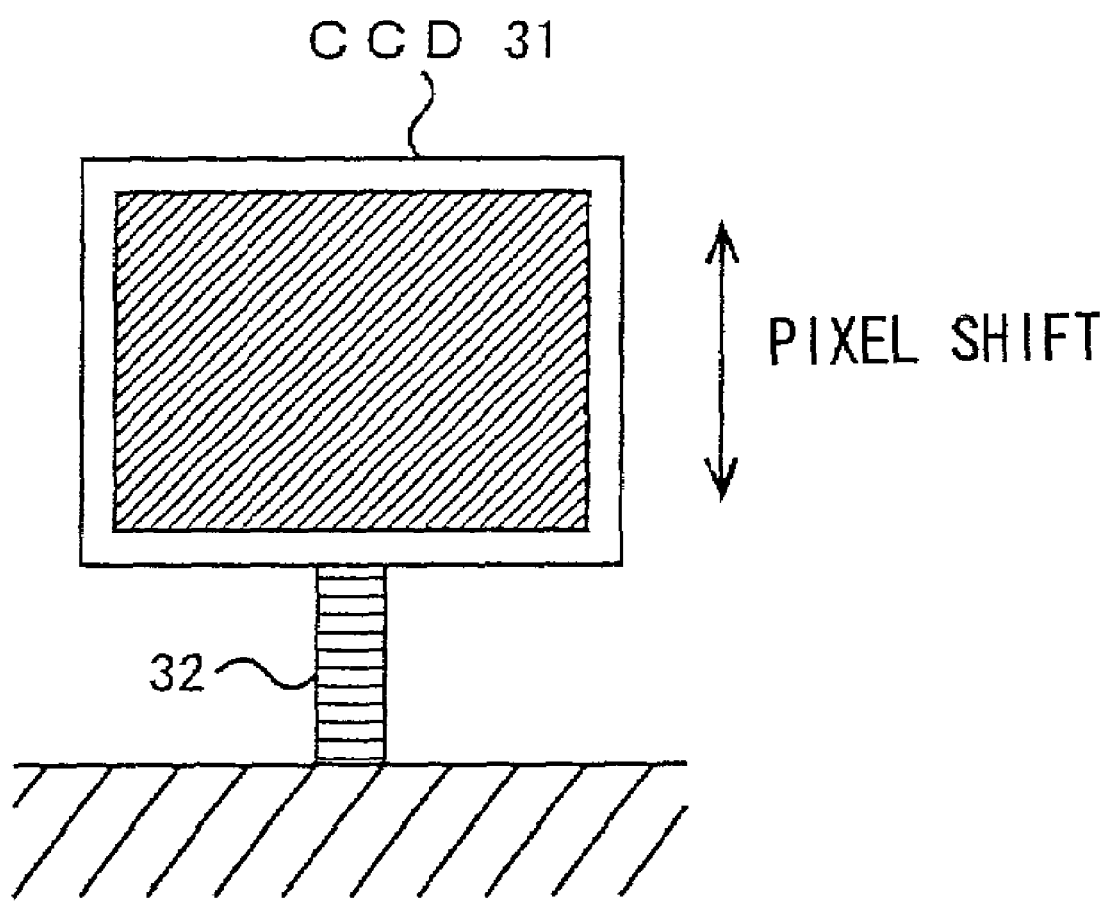
FIG. 14 illustrates a CCD and a piezoelectric device according to a fifth embodiment of the present invention.

A fifth embodiment of the present invention will now be described. FIG. 14 illustrates a CCD 31 provided inside of the CCD camera 7.

When photographing an image present on the writing field 1 by the CCD camera 7, the resolution poses a problem. In order to increase the resolution in photography by the CCD camera 7, according to the fifth embodiment, pixel shifting function is applied. Thereby, the writing field 1 is photographed twice, and, at this time, the CCD 31 shown in FIG. 14 is shifted by a distance corresponding to predetermined pixels (for example, one pixel) vertically or horizontally. Thereby, the resolution along the direction in which the CCD 31 is thus shifted can be increased double. By increasing the number of times of photography with the pixel shift each time, i.e., by 3 times, 4 times, . . . , the resolution is increased by 3 times, 4 times, . . . , accordingly.

In the example shown in FIG. 14, when photographing the writing field 1 in 2 steps with the CCD camera 7, the photography area is shifted by a distance for one pixel vertically. In order to embody a mechanism of shifting the CCD 31 as mentioned above, a piezoelectric device drive circuit 33 which drives a piezoelectric device 32 based on a signal given by the processing control part 8 may be employed for example.

The thus-obtained two pixel-shifted photographed images are input into the processing control part 8, and are combined together. Specifically, the combined image is obtained as a result of the pixels on the two images are arranged alternately one by one. According to the fifth embodiment, it is possible to effectively improve the resolution of the photographed image without increasing the pixels of the CCD 31 itself.

However, the number of pixels by which the shift is made and the direction of the shift are not limited. For example, the writing field 1 may be divided into division areas, and, each division area is photographed by the CCD camera. 7 by shifting the photography area of the camera 7 as mentioned above. Further, a user may select whether or not such shift function is applied, through the switches 11.

Figure 15:
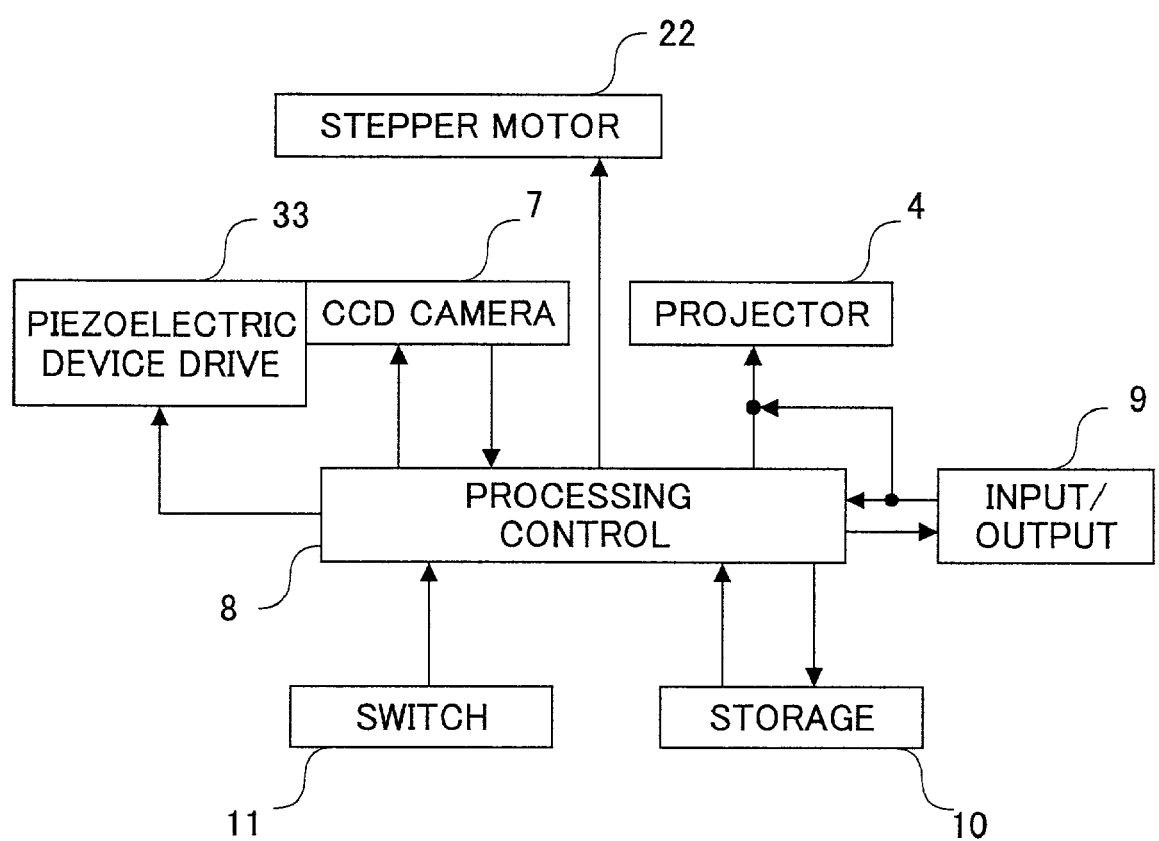
FIG. 15 shows a block diagram of the projection-type display device in the fifth embodiment of the present invention.

FIG. 15 is a block diagram showing a configuration of the fifth embodiment. A different point of the projection-type display device in the fifth embodiment from the above-mentioned third embodiment is that the piezoelectric device drive circuit 33 is added, the processing control part 8 controls the piezoelectric device drive circuit 33, and the CCD 31 is thereby mechanically moved by (distance corresponding to) 1 pixel, as mentioned above.

Generally many electric charge accumulation type CCD elements are used in the CCD camera 7. Many pixels are regularly arranged by unit area, and the CCD element accumulates the electric charge according to luminous energy irradiated there, and carries out photoelectric transform. Therefore, when it shifts by 1 pixel, a photograph is taken and the image data is combined afterwards when photographing a fixed area twice, it is possible to obtain a photograph same as that obtained by the double recording density. According to the fifth embodiment, for this reason, the resolution of the photographed image is improved twice. Further, by employing the piezoelectric device called a piezoelectric vibrator, it is possible to shift the CCD precisely by one pixel as the piezoelectric device has a monocrystal formation and vibrates at a peculiar pitch as well-known.

Figure 16:
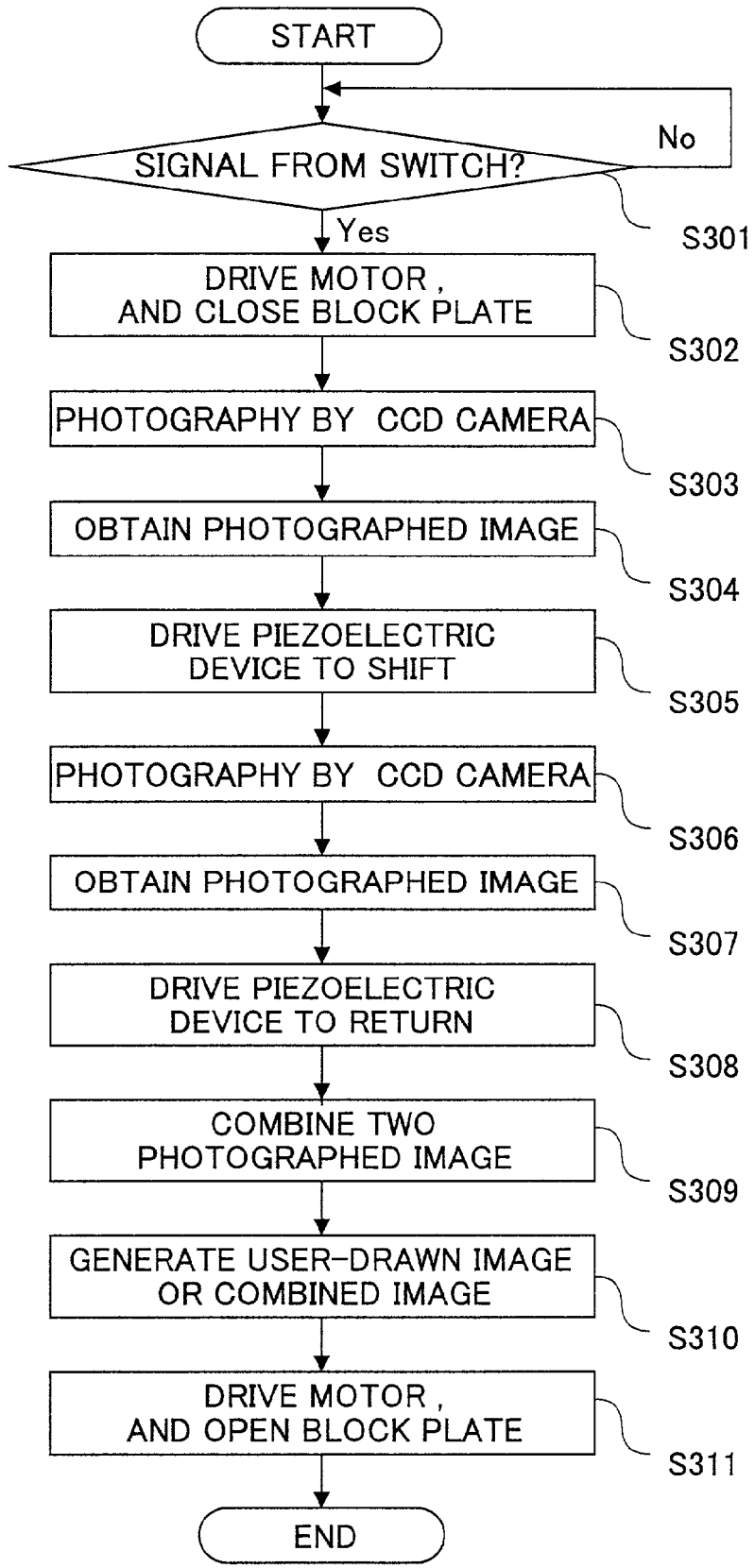
FIG. 16 shows a flow chart illustrating operation of the projection-type display device in the fifth embodiment of the present invention.

Operation of the processing control part 8 according to the fifth embodiment will now be described with reference to FIG. 16. The processing control part 8 drives the stepper motor 22 so as to make the light-blocking plate 21 be inserted, and, thus, block the light beam emitted by the projector 4 (Step S302), when a signal is inputted from the switches 11 (Yes of in a step S301). Then, after the light beam from the projector 4 is thus blocked, the processing control part 8 controls the CCD camera 7 so as to cause it to photograph the image on the writing field 1 (in a step S303), and acquires the thus-photographed image (in a step S304). At this time, the light source of the projector 4 is not turned off.

Then, the processing control part 8 moves the CCD 31 through the piezoelectric device drive circuit 33 by 1 pixel by means of the piezoelectric device 32 (in a step S305), and then controls the CCD camera 7 to take a photograph similarly (in a step S306), and acquires the thus-photographed image (in a step S307). Then, when the two photographed images shifted by 1 pixel are thus acquired, the processing control part 8 returns the CCD 31 to the original position by returning the piezoelectric device 32 to the original state through the piezoelectric device drive circuit 33 (in a step S308).

Then, the processing control part 8 combines the thus-obtained two photographed images (in a step S309). Then, the processing control part 8 produces the user-drawn image or combined image according to processing shown in FIG. 6 from the pixel combined image acquired in the step S309 (in a step S310). Then, the user-drawn image or combined image thus generated is stored as mentioned above in the storage part 10, or is output to the external apparatus from the input-and-output part 9.

Then, after acquiring the photographed image in the step S307, the processing control part 8 drives the stepper motor 22 so that the light-blocking plate 21 may be removed (in a step S311).

In addition, the user-drawn image or the combined image generated by this is stored as mentioned above in the storage part 10, or is output to the external apparatus from the input-and-output part 9.

Accordingly, it is possible to obtain high-resolution image without increasing the physical number of pixels on the CCD 31. Since the other configurations and operations are the same as those according to the third embodiment, duplicated description is omitted.

Figure 17:
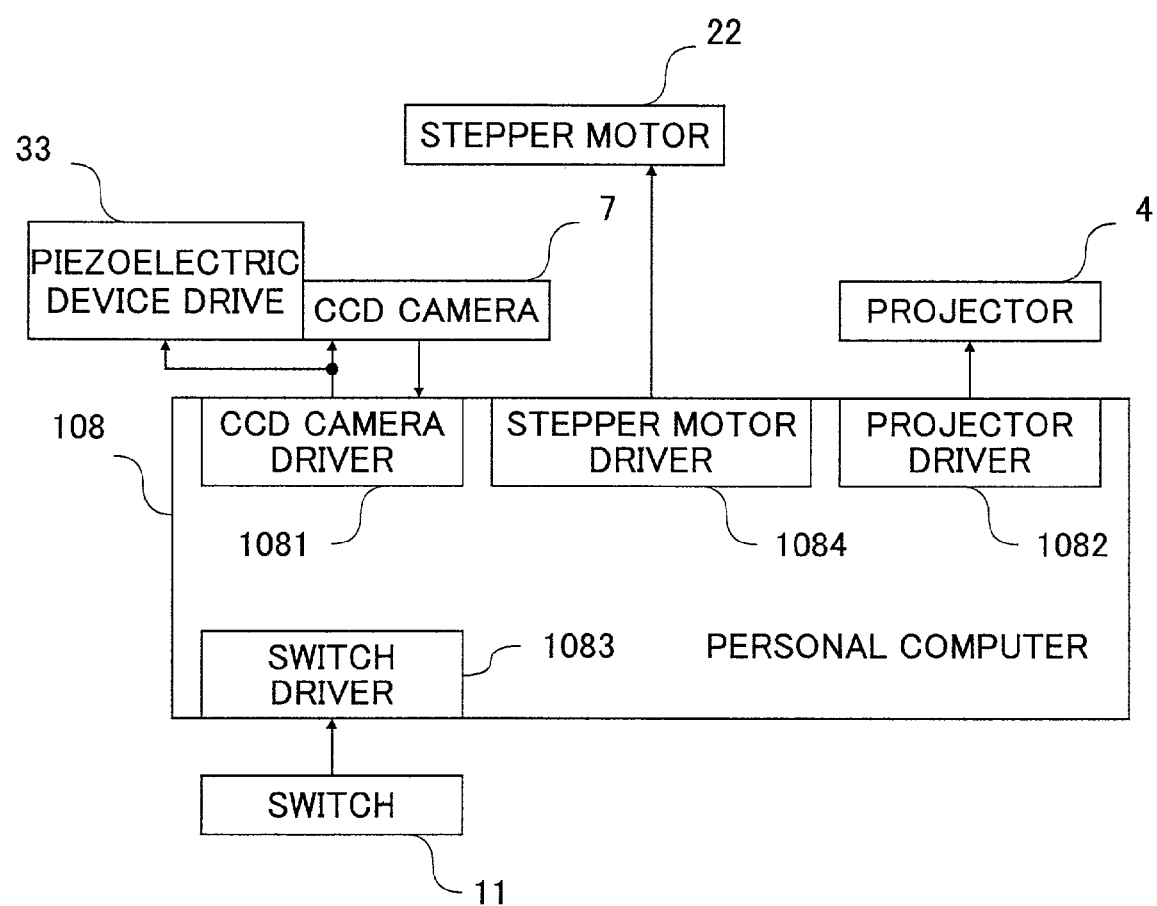
FIG. 17 shows a block diagram of a projection-type display device and a personal computer according to a sixth embodiment of the present invention.

The above-mentioned fifth embodiment may also be configured by utilizing a personal computer or the like together with software programs as the above-mentioned first embodiment is modified into the second embodiment, as in a sixth embodiment of the present invention. FIG. 17 shows a block diagram of this sixth embodiment of the present invention. This block configuration is the same as that of the fourth embodiment shown in FIG. 13 except that the piezoelectric device drive circuit 33 is controlled by the above-mentioned CCD camera driver 1081. All the functions/operations of the sixth embodiment are the same as those of the fifth embodiment, and duplicated description is omitted.

Figure 18:
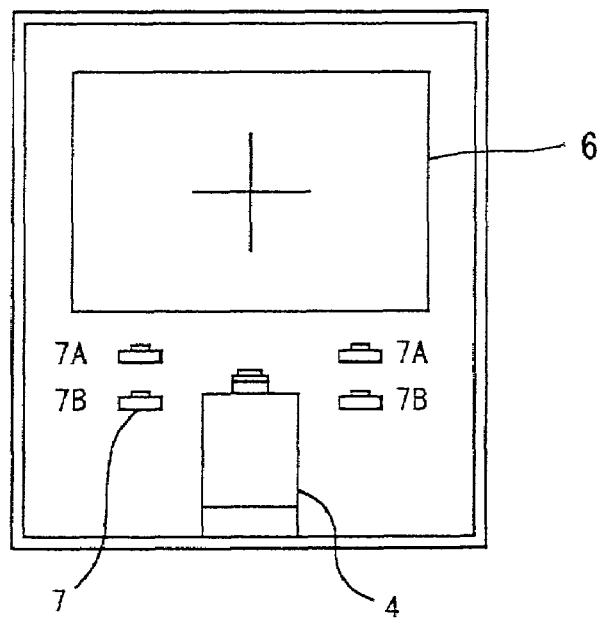
FIGS. 18 and 19 show an internal view of a projection-type display device in a seventh embodiment of the present invention.
Figure 19:
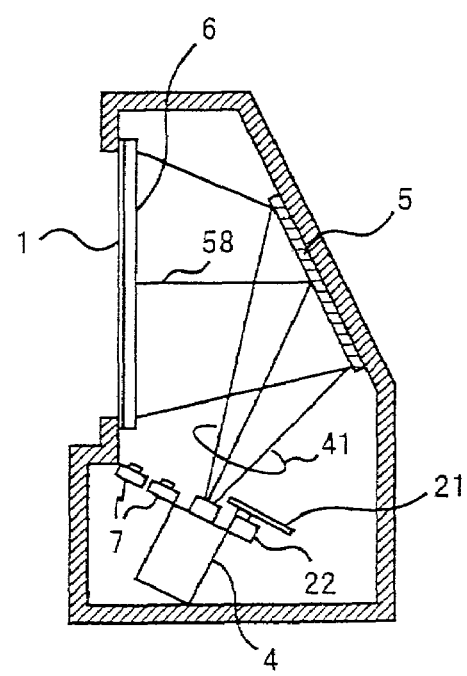
Figure 20:
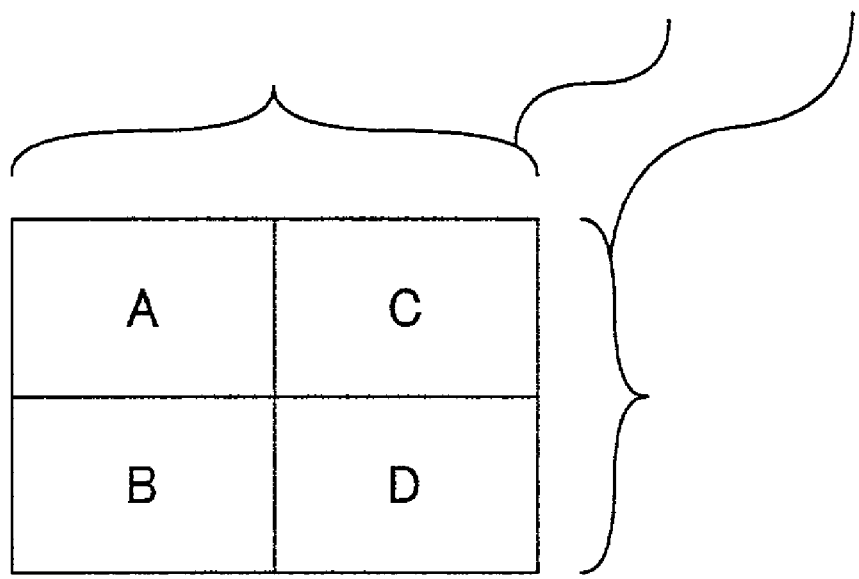
FIG. 20 illustrates divided photography areas on a writing field of the projection-type display device in the seventh embodiment of the present invention.

A seventh embodiment of the present invention will now be described. FIGS. 18 and 19 illustrate an internal configuration of a projection-type display device in the seventh embodiment of the present invention. As shown in the figures, a plurality of CCD cameras 7 (four sets in the configuration shown in FIG. 18) are provided. The writing field 1 is divided into four areas A, B, C and D, as shown in FIG. 20 corresponding to the respective photography areas of the CCD cameras 7A, 7B, 7C and 7D. Thereby, as a result of the CCD cameras 7A through 7D photographing the respective areas A through D, and the thus-obtained photographed images being combined by the processing control part 8, it is possible to take a photograph at high resolution. Thereby, the user-drawn image at high resolution can be obtained.

Generally, the resolution of an image is determined by a mutual relationship between the photography area and number of pixels of a CCD camera used. That is, when photographing a same area, resolution becomes higher as the area photographed is smaller. According to the seventh embodiment, since the above-mentioned writing field 1 is divided into the four areas, and the respective areas are photographed simultaneously by the four CCD cameras, the resolution of an image taken by each CCD camera can be made higher accordingly.

Further, according to the seventh embodiment, whether or not such a dividing photography manner is applied may be preferably determined by a user according to an intention of the user and/or an image formed on the writing field 1. Thereby, when the user-drawn image is a relatively simple one, and, or when the user does not wish such a dividing photography operation for some reasons, the dividing photography manner may not be applied, and a normal photography such that merely the full area or a predetermined area of the writing field 1 is photographed by the single CCD camera 7 is applied.

Furthermore, more preferably in terms of functions, the number of divisions in a case of the dividing photography may be determined by a user. Instructions as to whether or not the dividing photography mode is selected, and the number of division therein may be input through the switches 11. According to the seventh embodiment, operativity and functionality are improved.

Figure 21:
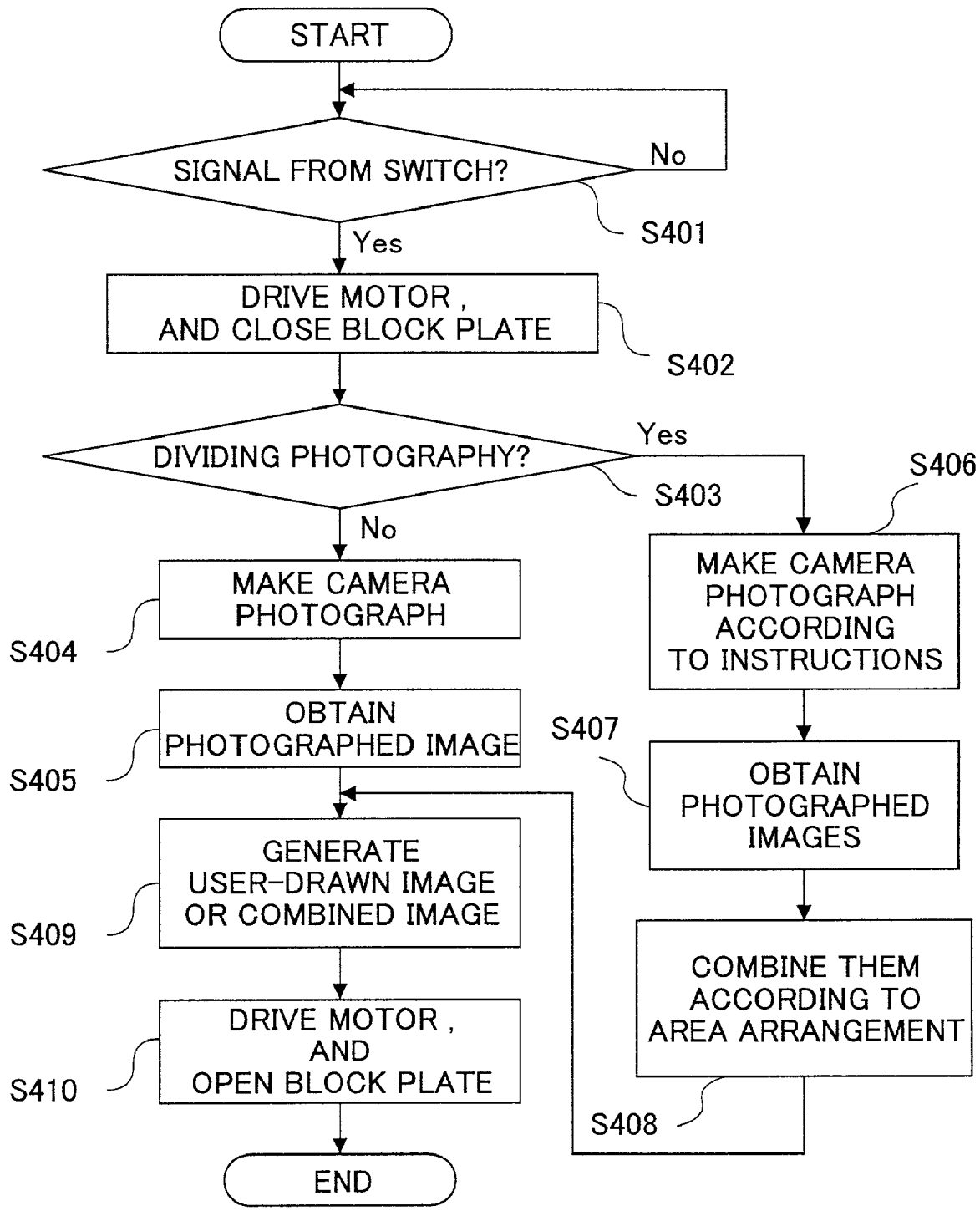
FIG. 21 shows a flow chart illustrating operation of the projection-type display device in the seventh embodiment of the present invention.

Operation of the processing control part 8 according to the seventh embodiment will now be described with reference to FIG. 21. The processing control part 8 drives the stepper motor 22 (in a step S402) so that the light-blocking plate 21 is inserted when a signal is input from the switch 11 (Yes of in a step S401). Then, after the light beam emitted from the projector 4 is thus blocked, the processing control part 8 determines whether instructions for the dividing photography have been input from the switches 11 (in a step S403). Preferably, as mentioned above, which one of the dividing photography areas is photographed, how many divisions the photography area are divided, and so forth may be input at the same time by the user.

When instructions for the dividing photography have not been input in the step S403 (No in the step S403), the processing control part 8 sends instructions to the CCD camera of the CCD cameras 7A through 7D which can photograph the entire area of the writing field 1 (for example, a configuration is made such that the CCD camera 7A can do so) (in a step S404), and acquires the photographed image therethrough (in a step S405).

On the other hand, when instructions for the dividing photography have been input in the step S403 (Yes in the step S403), the processing control part 8 sends instructions to CCD cameras (any ones of those 7A through 7D) corresponding to the number of photography area divisions, specific photography areas, and so forth according to the instructions (Step S406), and acquires all the photographed images thus taken (in a step S407).

Further, the processing control part 8 combines these photographed images acquired according to a predetermined arrangement of the photography areas on the CCD cameras 7, and thus produces one combined photographed image (in a step S408).

Then, the processing control part 8 produces the user-drawn image or combined image according to processing shown in FIG. 6 from the combined image acquired in the step S408 (in a step S409). Then, the user-drawn image or combined image thus generated is stored as mentioned above in the storage part 10, or is output to the external apparatus from the input-and-output part 9.

Then, after acquiring the photographed image in the step S405 or S407, the processing control part 8 drives the stepper motor 22 so that the light-blocking plate 21 may be removed (in a step S410).

In addition, the user-drawn image or the combined image generated is stored as mentioned above in the storage part 10, or is output to the external apparatus from the input-and-output part 9.

Thereby, all or a part of the user-drawn image is acquirable in the resolution suitable for the demand of the user. Since the other configurations and operations are the same as those of the third embodiment, duplicated description is omitted.

The above-mentioned seventh embodiment may also be configured by utilizing a personal computer or the like together with software programs as the above-mentioned first embodiment is modified into the second embodiment. However, in this case, the CCD driver 1081 in the personal computer 108 is configured such that the driving control of the plurality of CCD cameras (7A through 7D) can be carried out thereby.

Figure 22:
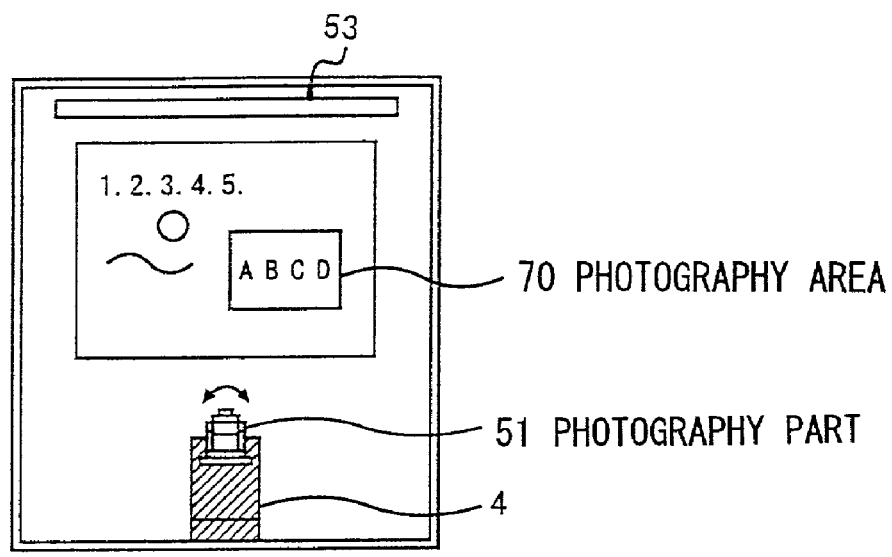
FIGS. 22 and 23 show an internal view of a projection-type display device in an eighth embodiment of the present invention.
Figure 23:
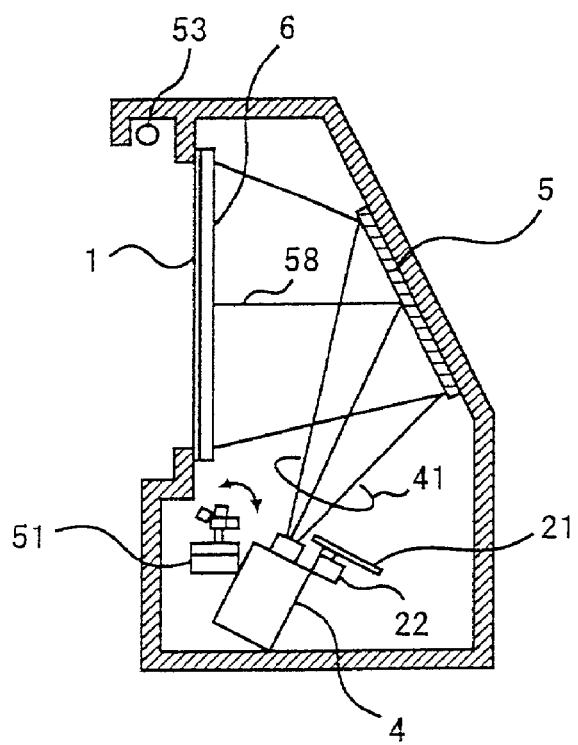

An eighth embodiment of the present invention will now be described. FIGS. 22 and 23 illustrate an internal configuration of a projection-type display device in the eighth embodiment of the present invention.

Figure 24:
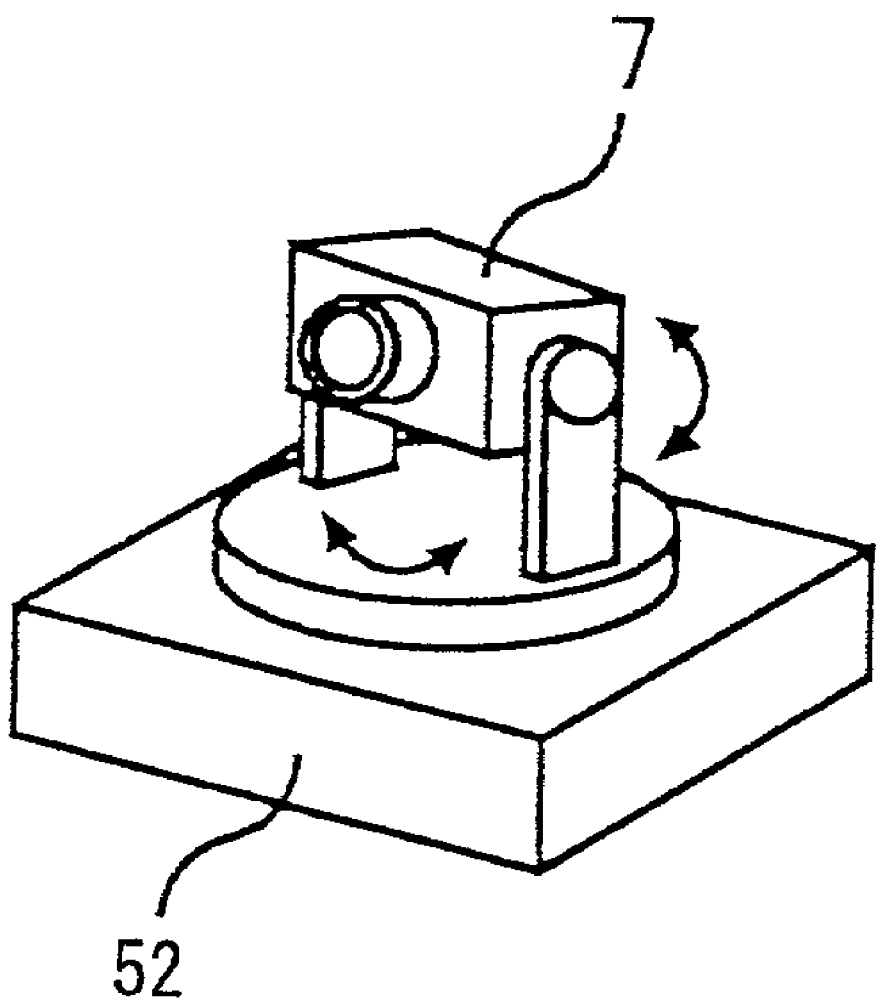
FIG. 24 shows a perspective view of a photography part used in the projection-type display device in the eighth embodiment.

In the eighth embodiment, a photography part 51 having pan/tilt functions performs photography on the writing field 1. FIG. 24 shows a perspective view of the photography part 51. The photography part 51 has a CCD camera 7 and a shaking mechanism the 52, and can control the photography area of the CCD camera 7 through the shaking mechanism 52 together with a well-known zoom function of the CCD camera 7.

A user may give instructions to the projection-type display device to indicate a desired part of the writing field 1 by operating the photography part 51 using some of the switches 11. At this time, the projector 4 displays a currently set photography area of the CCD camera 7 on the transparent screen 6, as shown in FIG. 22. Thereby, the user can control the photography area with checking the actually set area simultaneously.

Figure 25:
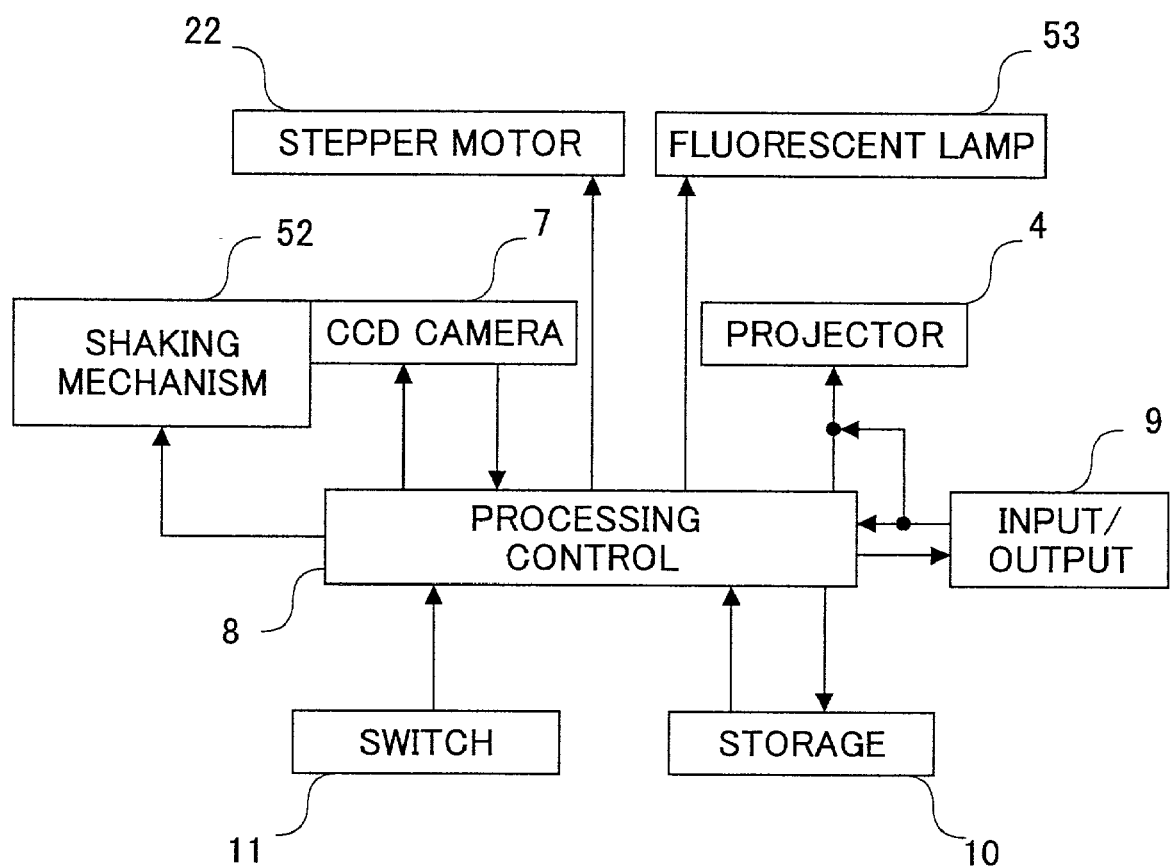
FIG. 25 shows a block diagram of the projection-type display device according to the eighth embodiment of the present invention.

FIG. 25 is a block diagram showing a configuration of the projection-type display device in the eighth embodiment. Different points of the projection-type display device from the projection-type display device in the above-mentioned fifth embodiment are that the shaking mechanism 52 is used instead of the piezoelectric device drive circuit 33, and also, a fluorescent light 53 for front lighting is added.

Based on user' instructions from the switches 11, the processing control part 8 performs control of the photography part 51. Further, in case high resolution photography is performed, the shaking mechanism 52 may be used. Namely, the writing field 1 is divided and photographed by a part-by-part manner, the thus-obtained partial photographed images are combined/collected/joined so that a high-resolution photography image is obtained. This dividing photography is achieved by appropriately controlling the optical axis of the CCD camera 7 through the above-mentioned tilt and pan functions of the shaking mechanism 52. The user can select either the dividing photography mode or the normal mode in which a photography image is obtained through a single photography operation without dividing the writing field 1, by using the switches 11. Further, the user may also select the number of divisions of the writing field 1 in the case of dividing photography mode, also through the switches 11.

The dividing photography is achieved by using the plurality of CCD cameras 7A through 7D according to the above-mentioned seventh embodiment, which needs costs for the number of CCD cameras. In contrast thereto, according to the eighth embodiment, only the single CCD camera 7 does the same through changing the optical axis thereof appropriately, which thus needs less costs. Thus, according to the eighth embodiment, the projection-type display device excellent in operativity and functionality can be provided at low costs.

Furthermore, this projection-type display device in the eighth embodiment is configured such that a storage area in the storage part 10 may be determined according to the angle of the CCD camera 7 in connection with the operation of the shaking mechanism 52.

Further, since the other configurations and operations are the same as those of the seventh embodiment, duplicated description is omitted.

Figure 26:
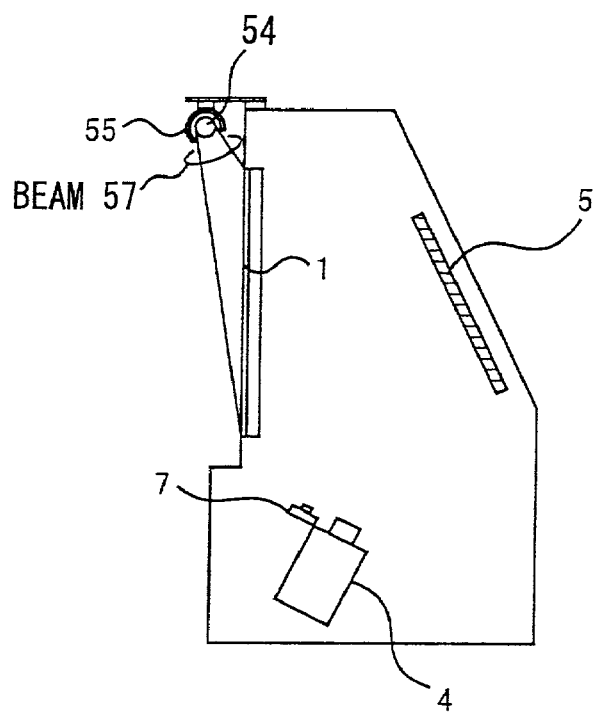
FIG. 26 shows an internal view of a projection-type display device in a ninth embodiment of the present invention.

A ninth embodiment of the present invention will now be described. FIG. 26 illustrates the projection-type display device in the ninth embodiment. An image on the writing field 1 is photographed by the CCD camera 7 provided inside of the projection-type display device. Therefore, the image on the writing field 1 can be photographed more effectively in a condition in which the image is illuminated from the user side or outside. That is, as shown in the figure, according to the present embodiment, a lighting 54 illuminates the writing field from the user side (outside of the projection-type display device).

Thereby, since the writing field 1 is illuminated from the side opposite to the projector 4, the efficiency of lighting is improved, and a photographed image becomes brighter. However, if the light from the lighting 54 is irradiated directly to the user, the user's visibility may be degraded accordingly. Then, in this embodiment, a lampshade 55 is provided such that the light from the lighting 54 may be prevented from directly irradiating the user. The other configurations and operations of the ninth embodiment are the same as those of the first embodiment, and duplicated description is omitted.

Figure 27A:
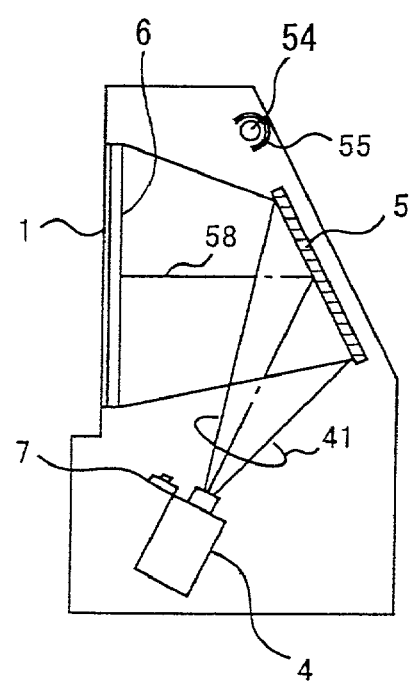
FIGS. 27A and 27B show an internal view of a projection-type display device in a tenth embodiment of the present invention.
Figure 27B:
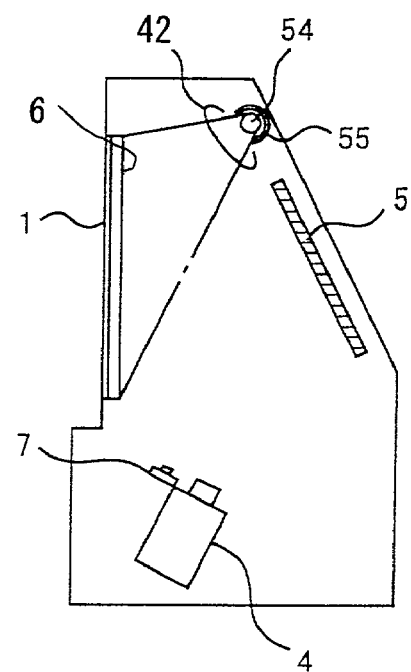

A tenth embodiment of the present invention will now be described. FIGS. 27A and 27B illustrate an inside configuration of a projection-type display device in the ninth embodiment FIG. 27A illustrates a light beam 41 emitted from the projector 4, while FIG. 27B illustrates a light beam 42 emitted from a lighting 54. If some obstacle were present along the path of the light beam 41 from the projector 4 toward the transparent screen 6, an image of the obstacle would be displayed on the transparent screen 6 which would be then photographed by the CCD camera 7 problematically.

Therefore, it is necessary to locate the lighting 54 out of the path of the light beam 41 from the projector 4 toward the transparent screen 6. Thus, since the lighting 55 illuminating the writing field 1 from the side of the projector 4 is located out of the path of the light beam 41 from the projector 4 according to the present embodiment, it does not have a bad influence on the projection image from the projector 4, and, also, the entire display device can be made smaller.

However, if the light from the lighting 54 irradiated directly the CCD camera 7, a photographed image taken by the CCD camera 7 would fade white. Then, according to the tenth embodiment, a lampshade 55 is provided in such a manner that the light from the lighting 54 may not directly irradiate the CCD camera 7.

The other configurations and operations of the tenth embodiment are same as those of the first embodiment, the duplicated description is omitted.

Figure 28A:
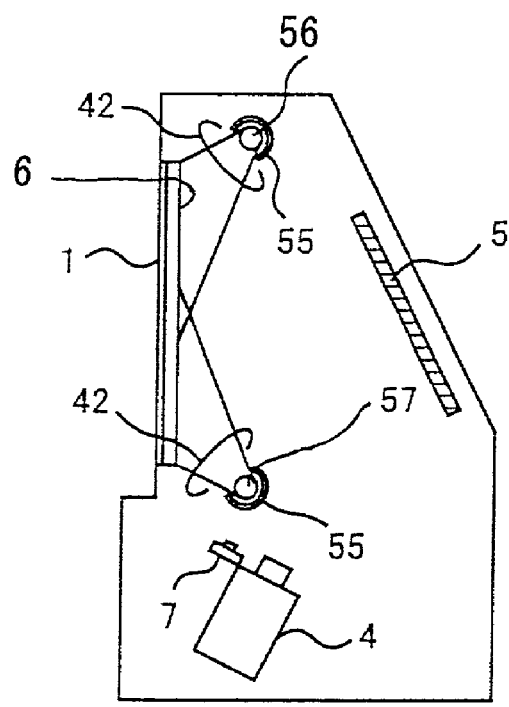
FIGS. 28A and 28B show an internal view of a projection-type display device in an eleventh embodiment of the present invention.
Figure 28B:
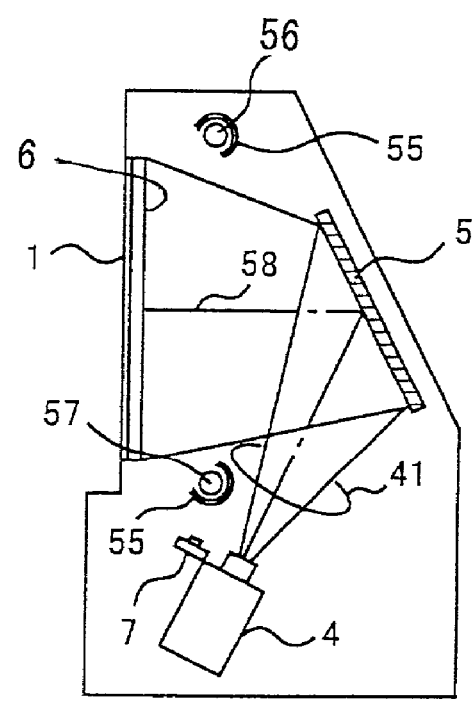

An eleventh embodiment of the present invention will now be described. FIGS. 28A and 28B illustrate an inside configuration of a projection-type display device in the eleventh embodiment. FIG. 28A illustrates respective light beams 42 from lightings 56 and 57, while FIG. 28B illustrates the light beam 41 from the projector 4.

The writing field 1 should be illuminated brightly as much as possible, and also, the illumination should be made uniformly. Therefore, according to the eleventh embodiment, the lightings 56 and 57 are provided in symmetrical positions with respect to an axis 58 corresponding to the optical axis of the projector 4, thereby the homogeneity in brightness on the writing field 1 being improved effectively.

Thus, according to the eleventh embodiment, since on the side of the projector 4, the lightings 56 and 57 are provided for illuminating the writing field 1 approximately symmetrically with respect to the axis 58 corresponding to the optical axis of the projector 4, it does not have a bad influence on a projection image from the projector 4, brightness thereon becomes uniform, and the unevenness on the image is eliminated.

However, if the light from the lightings 56 and 57 irradiated directly the CCD camera 7, a photographed image taken by the CCD camera 7 would fade white accordingly. Then, according to the-eleventh embodiment, lampshades 55 are provided such that the light from the lightings 56 and 57 may not directly irradiate the CCD camera 7.

The other configurations and operations are same as those of the first embodiment, and duplicated description is omitted.

Figure 29:
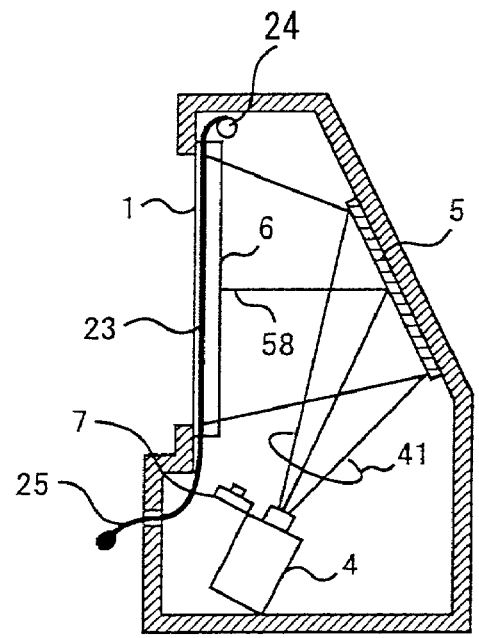
FIG. 29 shows an internal view of a projection-type display device in a twelfth embodiment of the present invention.

A twelfth embodiment of the present invention will now be described. FIG. 29 illustrates an internal configuration of a projection-type display device in the twelfth embodiment. As in a common screen used for an OHP, the color of the transparent screen 6 is gray. Accordingly, without particularly illuminating it, it is hard to clearly view an image drawn thereon. That is, when using the transparent screen 6 as a whiteboard, such a problem may occur. Then, according to the twelfth embodiment, an opaque white dispersion sheet 23 may be inserted between the writing field 1 and transparent screen 6.

When using the projection-type display device as a simple display device, the dispersion sheet 23 may be removed to a position such that it may not be obstructive by a winding mechanism. That is, the dispersion sheet 23 can be removed/inserted through pulling members 25 and a winding roller 24, as shown in the figure. It is noted that, in this embodiment, a configuration is made such that the writing field 1 and transparent screen 6 are pressed onto one another forcibly. Therefore, while being pressed by both of the writing field 1 and transparent screen 6, the dispersion sheet 23 is pulled out/inserted in by the pulling members 25/winding roller 24. Thereby, the dispersion sheet 23 is prevented from twisting or bending between the writing field 1 and transparent screen 6, but can be maintained in a plane state.

Figure 30:
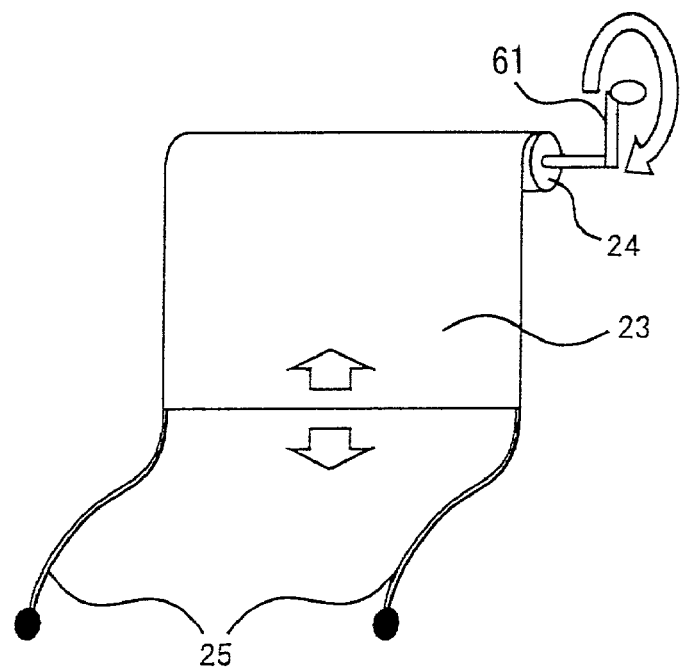
FIG. 30 shows a dispersion sheet and a winding roller according to the twelfth embodiment of the present invention shown in FIG. 29.

FIG. 30 illustrates an example of configuration of the above-mentioned dispersion sheet 23, puling members 25 and winding roller 25 together with a winding crank handle 61. As shown in the figure, the pulling members (ropes) 25 are provided at both ends of the dispersion sheet 23, and thereby, the dispersion sheet 23 can be pulled without right-and-left unbalance in pulling force. Further, the rotation shaft of the winding roller 24 is connected with the winding crank handle 61 provided outside of the projection-type display device. Thereby, the winding roller 24 can pull the dispersion sheet 23 without right-and-left unbalance.

According to the twelfth embodiment, the opaque white dispersion sheet 23 is provided on the rear side of the writing field 1 with respect to the user. Thus, the writing field 1 can also be used as a whiteboard satisfactorily, and thus, a usage scope of the projection-type display device can be effectively widened.

Since the other configurations and operations of the twelfth embodiment are the same as those of the first embodiment, duplicated description is omitted.

Figure 31:
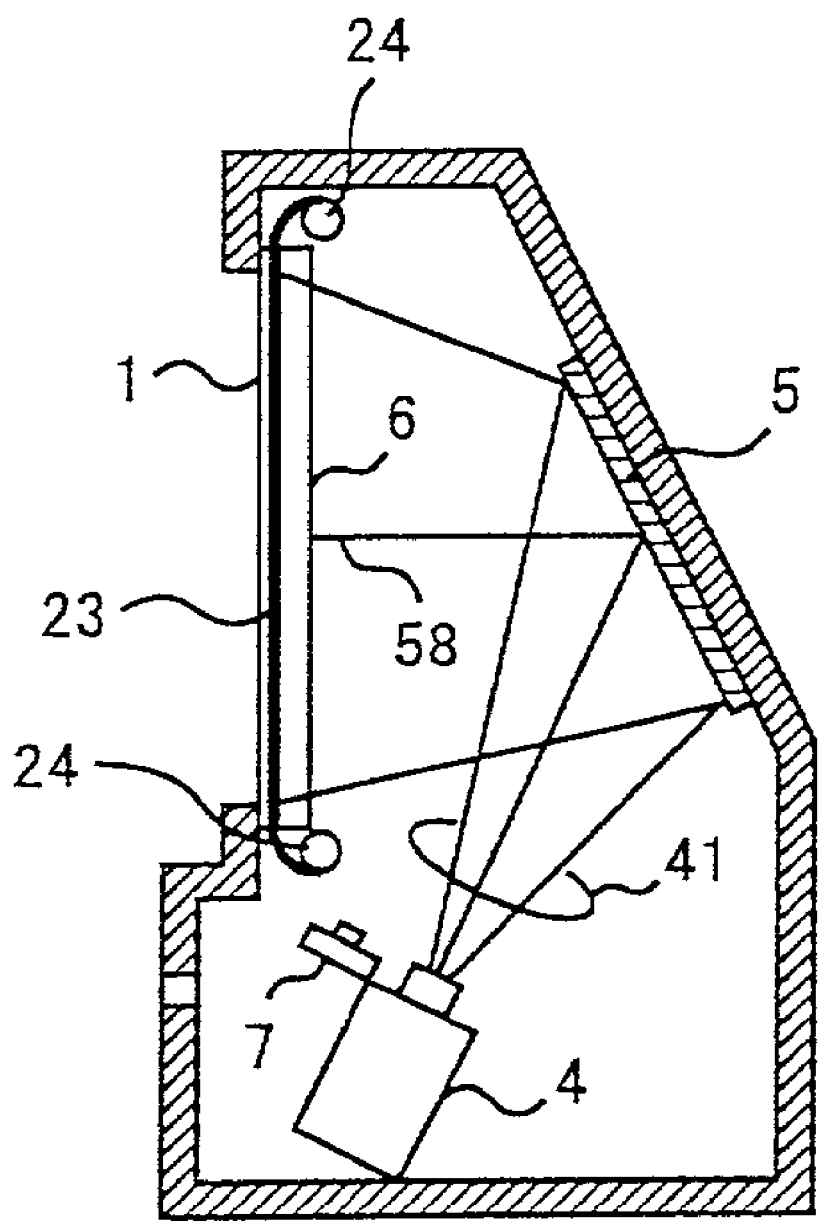
FIG. 31 shows an internal view of a projection-type display device in a thirteenth embodiment of the present invention.

A thirteenth embodiment of the present invention will now be described. FIG. 31 illustrates an inner configuration of a projection-type display device in the thirteenth embodiment. This projection-type display device also includes an opaque white dispersion sheet 23 which may be inserted between the writing field 1 and transparent screen 6 in a state such that the dispersion sheet 23 is pressed from both of the writing field 1 and transparent screen 6.

Figure 32A:
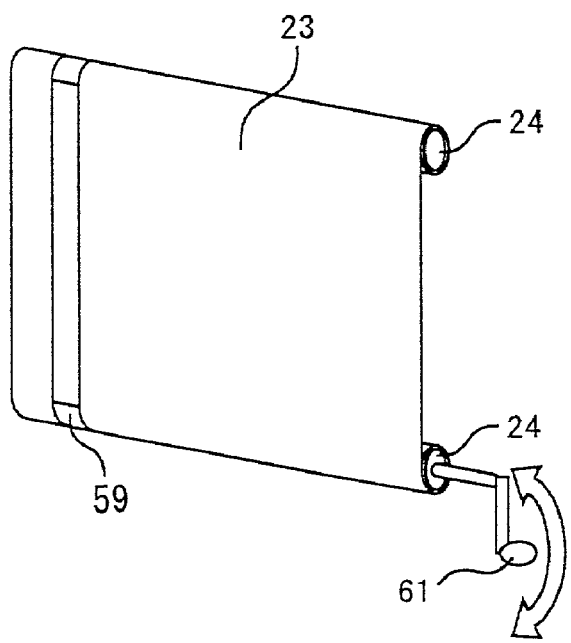
FIGS. 32A, 32B and 32C show a dispersion sheet and winding rollers according to the thirteenth embodiment of the present invention shown in FIG. 31.
Figure 32B:
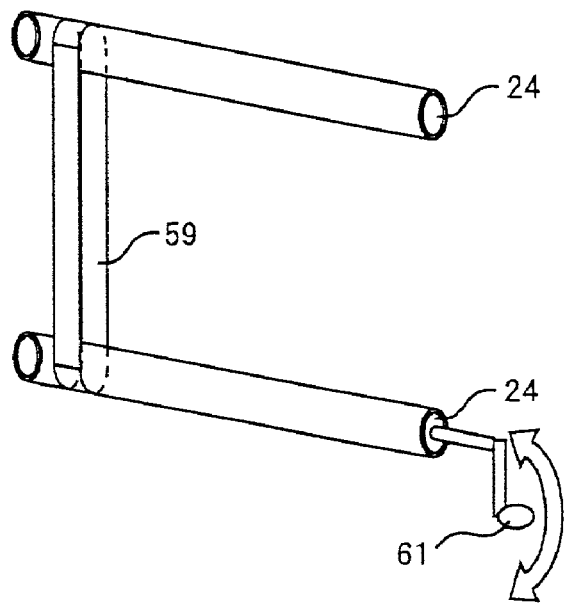
Figure 32C:
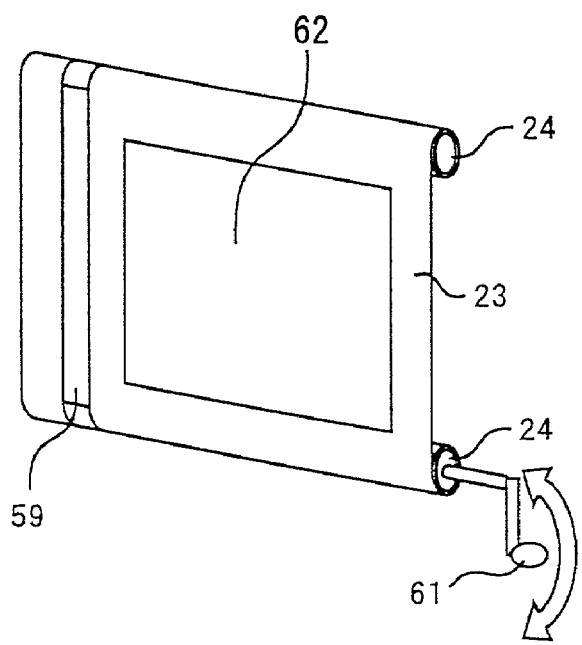

FIGS. 312A, 32B and 32C illustrate a configuration of the dispersion sheet 23 in the thirteenth embodiment together with winding rollers 24 and a winding crank handle 61. The dispersion sheet 23 includes a sufficiently transparent area 62 as shown in FIG. 32C to make an image projected on the transparent screen 6 visible by the user present outside of the display device. The transparent area 62 has a sufficiently large area such that a predetermined image projected by the projector 4 can be satisfactorily seen from the user. Further, the opaque white area of the diffusion sheet 23 other than the above-mentioned transparent area 62 also has a sufficiently large area such as to be able to cover the entire writing field 1, as shown in FIG. 32A.

Further, the dispersion sheet 23 (transparent area 62 is included therein) has top and bottom portions thereof wound by the rolling rollers 24, respectively, and can be moved arbitrarily through a winding crank handle 61 connected with the lower winding roller 24, as shown in the figures. That is, the winding crank handle 61 provided outside of the display device is connected with a rotation shaft of the lower winding roller 24, as in the above-mentioned twelfth embodiment. Furthermore, the upper and lower rolling rollers 24 are connected by a timing belt together such that these rollers rotate in synchronization with one another in the same direction. Thereby, the dispersion sheet 23 is rolled without right-and-left unbalance, and it becomes possible to move the transparent area 62 up and down arbitrarily. In addition, the above-mentioned transparent area 62 is thus movable upward or downward so that this area 62 may not overlap the writing field 1 at all, as shown in FIG. 32A.

According to the thirteenth embodiment, the opaque white dispersion sheet 23 can be inserted on the rear surface of the writing field 1 with respect to the position of the user as mentioned above, and thus, this display device can be satisfactorily used as a whiteboard and thus, the usage scope of the projection-type display device can be effectively widened.

Since the other configurations and operations are the same as those of the first embodiment, duplicated description is omitted.

A fourteenth embodiment of the present invention will now be described. According to any of the above-mentioned embodiments, in case the writing field 1 does not have a sufficiently structural strength such as to maintain the plane state during a drawing/writing operation performed by a user thereon with the pen 2 as shown in FIG. 1, an additional support board may be provided between the writing field 1 and transparent screen 6 or on the side of the transparent screen 6 opposite to the side of the writing field 1, for reinforcing the writing field 1, according to the fourteenth embodiment.

Figure 33A:
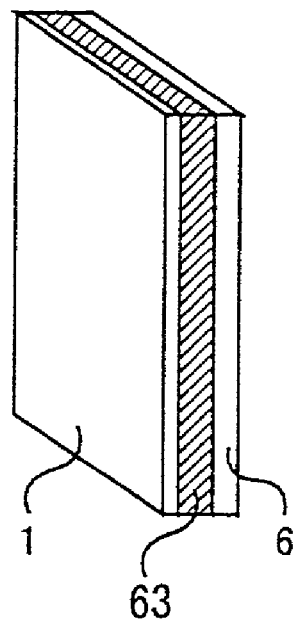
FIGS. 33A, 33B and 33C show a configuration of a support board, a writing field and a transparent screen according to a fourteenth embodiment of the present invention.
Figure 33B:
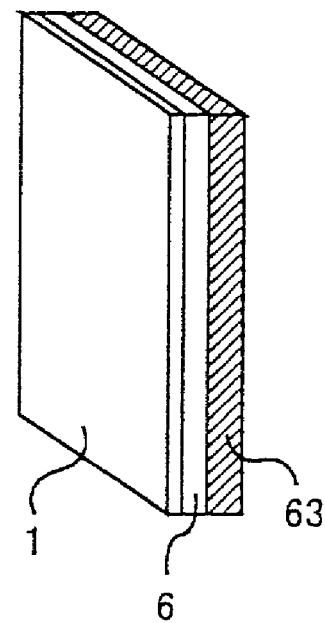

FIGS. 33A and 33B illustrate the above-mentioned examples of the support board 63 according to the fourteenth embodiment, together with the writing field 1 and transparent screen 6. In FIG. 33A, the support board 63 is provided between the writing field 1 and transparent screen 6, while, in FIG. 33B, the support board 63 is provided on the transparent sheet 6 opposite to the writing field 1. In each configuration, the support board 63 may be made of a material having a sufficient structural strength to bear a force applied by a user in drawing an image on the writing field 1 by the pen 2 and a sufficient transparency, such as an acrylic plate, a glass plate, etc. Further, in this configuration, when using a dispersion sheet 23 as provided in the above-mentioned twelfth or thirteenth embodiment, the dispersion sheet 23 may be preferably provided on the writing field 1 opposite to the user side.

Figure 33C:
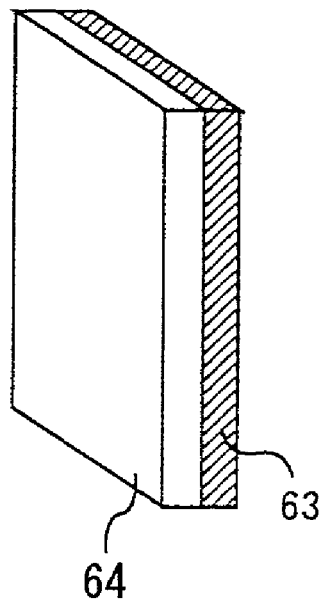

However, it is also possible that, as shown in FIG. 33C, the writing field 1 and transparent screen 6 are made of a common member (referred to as a writing-field transparent screen 64), in each of the above-mentioned embodiments. In such a case, as shown in FIG. 33C, it is preferable that a support board 63 is provided on the surface of the writing-field transparent screen 64 opposite to the user side, and, also, a dispersion sheet 23 can be inserted therebetween.

Since the other configurations and operations are the same as those of the first embodiment, duplicated description is omitted.

Further, the present invention is not limited to the above-described embodiments, and variations and modifications may be made without departing from the scope of the present invention.

The present application is based on Japanese priority applications. Nos. 2001-059321 and 2001-255119, filed on Mar. 2, 2001 and Aug. 24, 2001, respectively, the entire contents of which are hereby incorporated by reference.

What is claimed is:

1. A projection-type display device comprising:
    a projection surface on which a predetermined projection image is displayed through projection from a rear side;
    a writing surface on which an image can be drawn directly from a front side in a superimposing manner with the projection image displayed on said projection surface;
    a photography part photographing an image drawn on said writing surface from the rear side; and
    a blocking part blocking a light beam emitted from a projecting part projecting the light beam onto said projection surface so as to display the projection image thereon, wherein when said photography part photographs an image said blocking part blocks the light beam emitted from the projecting part so as to prevent all of the light beam from being applied to the projection surface.

2. The projection-type display device as claimed in claim 1, further comprising a projection part which emits a light beam comprising an image signal onto said projection surface so as to display the predetermined image on said projection surface.

3. The projection-type display device as claimed in claim 2, wherein:
    said writing surface comprises the same surface as said projection surface or is located on the same the side of said projection surface as that on which a user who draws an image onto said writing surface exists; and
    said display device further comprises an extracting part extracting a user-drawn image from an image photographed by said photography part.

4. The projection-type display device as claimed in claim 3, further comprising a combining part combining at least a part of the projection image projected onto said projection surface with the user-drawn image extracted by said extracting part.

5. The projection-type display device as claimed in claim 4, wherein:
    a mode selecting part is provided through which a selection is made between a first photography mode in which the user-drawn image is obtained and a second photography mode in which the combined image is obtained.

6. The projection-type display device as claimed in claim 1, wherein the optical axis of said photography part is perpendicular to said writing surface.

7. The projection-type display device as claimed in claim 1, further comprising a part making a correspondence between the projection image and drawn image.

8. The projection-type display device as claimed in claim 1, further comprising:
    an input part inputting the projection image externally;
    a recording part recording at least one of the projection image, user-drawn image and combined image; and
    an output part outputting the user-drawn image externally.

9. The projection-type display device as claimed in claim 1, wherein:
    said writing surface is divided into a plurality of areas;
    said photography part takes a plurality of photographs of respective ones of the plurality of areas; and
    a combining part is provided, and, thereby, a thus-obtained plurality of photographed images are combined.

10. The projection-type display device as claimed in claim 9, further comprising an input part through which instructions of at least one of whether or not a dividing photography is performed in which a part or all of said writing surface is divided and each division is photographed, and the number of divisions in the dividing photography, are input.

11. The projection-type display device as claimed in claim 1, wherein:
    a moving part moving a photography area of said photography part on said writing surface is provided;
    said photography part takes a photograph several times in a manner such that the photography area thereof each time corresponds to a different division of said writing surface; and
    a combining part is provided, and, thereby, photographed images obtained through the several times of photography are combined.

12. The projection-type display device as claimed in claim 11, further comprising a part displaying the photography area onto said projection surface.

13. The projection-type display device as claimed in claim 11, further comprising an input part through which instructions of at least one of whether or not a dividing photography is performed in which a part or all of said writing surface is divided and each division is photographed, and the number of divisions in the dividing photography, are input.

14. The projection-type display device as claimed in claim 1, further comprising a lighting part illuminating said writing surface from a side opposite to a side on which said photography part is provided.

15. The projection-type display device as claimed in claim 14, wherein said lighting part comprises a plurality of light sources located symmetrically with respect to a central axis of said writing part or an axis corresponding to an optical axis of a part projecting the projecting image onto said projection surface.

16. The projection-type display device as claimed in claim 1, further comprising at least one lighting part illuminating said writing surface from a side on which said photography part is provided.

17. The projection-type display device as claimed in claim 16, wherein said lighting part comprises a plurality of light sources located symmetrically with respect to a central axis of said writing part or an axis corresponding to an optical axis of a part projecting the projecting image onto said projection surface.

18. The projection-type display device as claimed in claim 1, further comprising a dispersion surface removably provided on a surface of said writing surface opposite to a user who draws an image on said writing surface.

19. The projection-type display device as claimed in claim 1, further comprising:
   a dispersion sheet comprising a dispersion area which covers all or a part of said writing part and a transparent area which transmits, to said writing surface, at least a part of a light beam emitted by a part which projects the projection image onto said projection surface; and
   a moving part moving said dispersion sheet.

20. The projection-type display device as claimed in claim 1, wherein:
   a shifting part shifting a photography area of said photography part on said writing surface is provided;
   said photography part takes a photograph several times in a manner such that the photography area thereof is shifted each time by said shifting part; and
   a combining part is provided, and, thereby, photographed images obtained through the several times of photography are combined.

21. The projection-type display device as claimed in claim 20, wherein;
   said shifting part shifts the photography area by a distance corresponding to one pixel each time;
   said shifting part comprises a piezoelectric device; and
   the vibration distance of said piezoelectric device corresponds to one pixel.

22. A projection-type display device connected to a computer via a communication network, and operating according to instructions given by said computer, comprising:
   a projection surface on which a predetermined projection image is displayed through projection from a rear side;
   a writing surface on which an image can be drawn directly from a front side in a superimposing manner with the projection image displayed on said projection surface;
   a photography part photographing an image drawn on said writing surface from the rear side; and
   a blocking part blocking a light beam emitted from a projecting part projecting the light beam onto said projection surface so as to display the projection image thereon, wherein when said photography part photographs an image said blocking part blocks the light beam emitted from the projecting part so as to prevent all of the light beam from being applied to the projection surface.

23. A computer readable recording medium storing a software program for operating a projection-type display device which comprises:
   a projection surface on which a predetermined projection image is displayed through projection from a rear side;
   a writing surface on which an image can be drawn directly from a front side in a superimposing maimer with the projection image displayed on said projection surface; and
   a photography part photographing an image drawn on said writing surface from the rear side; and
   a blocking part blocking a light beam emitted from a projecting part projecting the light beam onto said projection surface so as to display the projection image thereon, wherein when said photography part photographs an image said blocking part blocks the light beam emitted from the projecting part so as to prevent all of the light beam from being applied to the projection surface,
   wherein said software program is read by a computer which thus performs the following steps:
      a) making said photography part to take a photograph of said writing surface; and
      b) extracting an image drawn by a user onto said writing surface, from the photographed image obtained through said step a).

24. The computer readable recording medium as claimed in claim 23, wherein said software program causes the computer to further perform the following step:
   c) combining at least a part of the projection image projected onto said projection surface with the user-drawn image extracted by said step b).

25. The computer readable recording medium as claimed in claim 24, wherein said software program causes the computer to further perform the following step:
   d) causing a user to select a mode between a first photography mode in which the user drawn image is obtained and a second photography mode in which the combined image is obtained.

26. The computer readable recording medium as claimed in claim 23, wherein said software program causes the computer to further perform the following steps:
   c) causing said photography part to take a plurality of photographs of respective ones of a predetermined plurality of divisions of said writing surface; and
   d) combining a thus-obtained plurality of photographed images.

27. The computer readable recording medium as claimed in claim 26, wherein said software program causes the computer to further perform the following steps:
   e) causing a user to determine at least one of whether or not a dividing photography is performed in which a part or all of said writing surface is divided and each division is photographed, and the number of divisions in the dividing photography.

28. The computer readable recording medium as claimed in claim 23, wherein said software program causes the computer to further perform the following steps:
   c) moving a photography area of said photography part on said writing surface;
   d) causing said photography part to take a photograph several times in a manner such that the photography area thereof each time corresponds to a different division of said writing surface; and
   e) combining photographed images obtained through the several times of photography.

29. The computer readable recording medium as claimed in claim 28, wherein said software program causes the computer to further perform the following steps:

f) causing a user to determine at least one of whether or not a dividing photography is performed in which a part or all of said writing surface is divided and each division is photographed and, the number of divisions in the dividing photography.

30. A projection-type display device which comprises:
a projection surface on which a predetermined projection image is displayed through projection from a rear side;
a writing surface on which an image can be drawn directly from a front side in a superimposing manner with the projection image displayed on said projection surface;
a photography part photographing an image drawn on said writing surface from the rear side;
a blocking part blocking a light beam emitted from a projecting part projecting the light beam onto said projection surface so as to display the projection image thereon, wherein when said photography part photographs an image said blocking part blocks the light beam emitted from the projecting part so as to prevent all of the light beam from being applied to the projection surface; and
a software program read by a computer which performs the following steps:
  a) making said photography part to take a photograph of said writing surface; and
  b) extracting an image drawn by a user onto said writing surface, from the photographed image obtained through said step a).

31. The projection-type display device as claimed in claim 30, wherein said software program causes the computer to further perform the following step: c) combining at least a part of the projection image projected onto said projection surface with the user-drawn image extracted by said step b).

32. The projection-type display device as claimed in claim 31, wherein said software program causes the computer to further perform the following steps: d) causing a user to select a mode between a first photography mode in which the user-drawn image is obtained and a second photography mode in which the combined image is obtained.

33. The projection-type display device as claimed in claim 30, wherein said software program causes the computer to further perform the following steps: c) causing said photography part to take a plurality of photographs of respective ones of a predetermined plurality of divisions of said writing surface; and d) combining a thus-obtained plurality of photographed images.

34. The projection-type display device as claimed in claim 33, causing the computer to further perform the following steps: e) causing a user to determine at least one of whether or not a dividing photography is performed in which a part or all of said writing surface is divided and each division is photographed, and the number of divisions in the dividing photography.

35. The projection-type display device as claimed in claim 30, wherein said software program causes the computer to further perform the following steps: c) moving a photography area of said photography part on said writing surface; d) causing said photography part to take a photograph several times in a manner such that the photography area thereof each time corresponds to a different division of said writing surface; and e) combining photographed images obtained through the several times of photography.

36. The projection-type display device as claimed in claim 35, causing the computer to further perform the following steps: f) causing a user to determine at least one of whether or not a dividing photography is performed in which a part or all of said writing surface is divided and each division is photographed, and the number of divisions in the dividing photography.

37. A projection-type display device comprising:
a projection surface on which a predetermined projection image is displayed through projection from a rear side;
a writing surface on which an image can be drawn directly from a front side in a superimposing manner with the projection image displayed on said projection surface; and
a photography part photographing an image drawn on said writing surface from the rear side,
wherein:
a shifting part shifting a photography area of said photography part on said writing surface is provided;
said photography part takes a photograph at least two times in a manner such that the photography area thereof is shifted each time by said shifting part; and
a combining part is provided, and, thereby, photographed images obtained through the several times of photography are combined.

38. The projection-type display device as claimed in claim 37, further comprising a projection part which emits a light beam comprising an image signal onto said projection surface so as to display the predetermined image on said projection surface.

39. The projection-type display device as claimed in claim 38, wherein:
said writing surface comprises the same surface as said projection surface or is located on the same the side of said projection surface as that on which a user who draws an image onto said writing surface exists; and
said display device further comprises an extracting part extracting a user-drawn image from an image photographed by said photography part.

40. The projection-type display device as claimed in claim 39, further comprising a combining part combining at least a part of the projection image projected onto said projection surface with the user-drawn image extracted by said extracting part.

41. The projection-type display device as claimed in claim 40, wherein:
a mode selecting part is provided through which a selection is made between a first photography mode in which the user-drawn image is obtained and a second photography mode in which the combined image is obtained.

42. The projection-type display device as claimed in claim 37, wherein the optical axis of said photography part is perpendicular to said writing surface.

43. The projection-type display device as claimed in claim 37, further comprising a part making a correspondence between the projection image and drawn image.

44. The projection-type display device as claimed in claim 37, further comprising:
an input part inputting the projection image externally;
a recording part recording at least one of the projection image, user-drawn image and combined image; and
an output part outputting the user-drawn image externally.

45. The projection-type display device as claimed in claim 37, wherein:
said shifting part shifts the photography area by a distance corresponding to one pixel each time;
said shifting part comprises a piezoelectric device; and
the vibration distance of said piezoelectric device corresponds to one pixel.

46. The projection-type display device as claimed in claim 37, wherein:
said writing surface is divided into a plurality of areas;
said photography part takes a plurality of photographs of respective ones of the plurality of areas; and
a combining part is provided, and, thereby, a thus-obtained plurality of photographed images are combined.

47. The projection-type display device as claimed in claim 46, further comprising an input part through which instructions of at least one of whether or not a dividing photography is performed in which a part or all of said writing surface is divided and each division is photographed, and the number of divisions in the dividing photography, are input.

48. The projection-type display device as claimed in claim 37, wherein:
a moving part moving a photography area of said photography part on said writing surface is provided;
said photography part takes a photograph several times in a maimer such that the photography area thereof each time corresponds to a different division of said writing surface; and
a combining part is provided, and, thereby, photographed images obtained through the several times of photography are combined.

49. The projection-type display device as claimed in claim 48, further comprising a part displaying the photography area onto said projection surface.

50. The projection-type display device as claimed in claim 48, further comprising an input part through which instructions of at least one of whether or not a dividing photography is performed in which a part or all of said writing surface is divided and each division is photographed, and the number of divisions in the dividing photography, are input.

51. The projection-type display device as claimed in claim 37, further comprising a lighting part illuminating said writing surface from a side opposite to a side on which said photography part is provided.

52. The projection-type display device as claimed in claim 51, wherein said lighting part comprises a plurality of light sources located symmetrically with respect to a central axis of said writing part or an axis corresponding to an optical axis of a part projecting the projecting image onto said projection surface.

53. The projection-type display device as claimed in claim 37, further comprising at least one lighting part illuminating said writing surface from a side on which said photography part is provided.

54. The projection-type display device as claimed in claim 53, wherein said lighting part comprises a plurality of light sources located symmetrically with respect to a central axis of said writing part or an axis corresponding to an optical axis of a part projecting the projecting image onto said projection surface.

55. The projection-type display device as claimed in claim 37, further comprising a dispersion surface removably provided on a surface of said writing surface opposite to a user who draws an image on said writing surface.

56. The projection-type display device as claimed in claim 37, further comprising:
a dispersion sheet comprising a dispersion area which covers all or a part of said writing part and a transparent area which transmits, to said writing surface, at least a part of a light beam emitted by a part which projects the projection image onto said projection surface; and
a moving part moving said dispersion sheet.

* * * * *